(12) United States Patent
Tsunashima

(10) Patent No.: US 12,143,717 B2
(45) Date of Patent: Nov. 12, 2024

(54) INFORMATION PROCESSING APPARATUS, INFORMATION PROCESSING METHOD, AND PROGRAM

(71) Applicant: SONY GROUP CORPORATION, Tokyo (JP)

(72) Inventor: Nobuhiro Tsunashima, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 113 days.

(21) Appl. No.: 17/912,436

(22) PCT Filed: Mar. 10, 2021

(86) PCT No.: PCT/JP2021/009441
§ 371 (c)(1),
(2) Date: Sep. 16, 2022

(87) PCT Pub. No.: WO2021/193053
PCT Pub. Date: Sep. 30, 2021

(65) Prior Publication Data
US 2023/0132986 A1    May 4, 2023

(30) Foreign Application Priority Data

Mar. 24, 2020  (JP) ................................ 2020-052975

(51) Int. Cl.
*H04N 23/67*         (2023.01)
*G06T 7/20*          (2017.01)
(Continued)

(52) U.S. Cl.
CPC ............ *H04N 23/675* (2023.01); *G06T 7/20* (2013.01); *G06T 7/70* (2017.01); *G06V 10/761* (2022.01)

(58) Field of Classification Search
CPC .. G06T 7/70; G06T 7/20; G06T 7/246; G06T 7/33; G06T 7/73; G06V 10/761;
(Continued)

(56) References Cited

U.S. PATENT DOCUMENTS 11,263,780 B2 *   3/2022   Tsunashima ............. G06T 7/80
11,514,600 B2 *  11/2022   Wakita ................... H04N 7/181
(Continued)

FOREIGN PATENT DOCUMENTS

JP          2006-113001 A        4/2006
JP          2011211598 A   *    10/2011   ............ G03B 15/00
(Continued)

*Primary Examiner* — Marly S Camargo
(74) *Attorney, Agent, or Firm* — Paratus Law Group, PLLC

(57) ABSTRACT

There is provided an information processing apparatus, an information processing method, and a program capable of improving accuracy of automatic adjustment of focus of a shooting apparatus without using a ranging sensor. The information processing apparatus includes: a position detection section that detects a distance between a first shooting apparatus and a shooting target on the basis of a positional relationship among the first shooting apparatus, a second shooting apparatus, and the shooting target, which is a target to be focused; and a focus control section that controls focus of the first shooting apparatus on the basis of a distance between the first shooting apparatus and the shooting target. The present technology can be applied to a system including a plurality of shooting apparatuses, for example.

20 Claims, 15 Drawing Sheets

(51) Int. Cl.
*G06T 7/246* (2017.01)
*G06T 7/33* (2017.01)
*G06T 7/70* (2017.01)
*G06T 7/73* (2017.01)
*G06V 10/14* (2022.01)
*G06V 10/74* (2022.01)
*H04N 23/66* (2023.01)
*H04N 23/90* (2023.01)

(58) Field of Classification Search
CPC ...... G06V 10/14; H04N 23/61; H04N 23/661; H04N 23/633; H04N 23/67; H04N 23/90; H04N 23/675
See application file for complete search history.

(56) References Cited

U.S. PATENT DOCUMENTS

| 2022/0091487 A1* | 3/2022 | Xie | G03B 3/10 |
| 2024/0031669 A1* | 1/2024 | Tsunashima | H04N 23/632 |

FOREIGN PATENT DOCUMENTS

| JP | 2013005405 A | * | 1/2013 | H04N 5/232 |
| JP | 2016-032125 A | | 3/2016 | |
| JP | 2019-003005 A | | 1/2019 | |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2021/009441 (filed on Mar. 10, 2021) under 35 U.S.C. § 371, which claims priority to Japanese Patent Application No. 2020-052975 (filed on Mar. 24, 2020), which are all hereby incorporated by reference in their entirety.

TECHNICAL FIELD

The present technology relates to an information processing apparatus, an information processing method, and a program, and particularly relates to an information processing apparatus, an information processing method, and a program suitable for use in a case of focusing a shooting apparatus.

BACKGROUND ART

In general, focus of the camera is adjusted on the basis of a distance (hereinafter, referred to as subject distance) to a subject of target to be focused (hereinafter, referred to as shooting target).

For example, in a case of manually adjusting the focus, the user roughly adjusts the focus by estimating the distance to the shooting target. Next, the user finely adjusts the focus while viewing the image generated by the imaging element of the camera or the image of the shooting target formed by the lens.

On the other hand, in a case of automating the focus adjustment, for example, the subject distance to the shooting target is measured by a ranging sensor provided in the vicinity of the camera, and the focus of the camera is adjusted on the basis of the measured subject distance (see, for example, Patent Document 1).

CITATION LIST

Patent Document

Patent Document 1: Japanese Patent Application Laid-Open No. 2019-3005

SUMMARY OF THE INVENTION

Problems to be Solved by the Invention

However, the ranging sensor has advantages and disadvantages depending on the type. For example, depending on the type of ranging sensor, the range in which the distance can be measured is narrowed, the resolution of the distance measurement is rough, or the distance measurement is easily affected by sunlight. Therefore, it is not always possible to accurately focus on the shooting target, and there is a case where the accuracy of focus decreases depending on the situation.

The present technology has been made in view of such a situation, and an object thereof is to improve accuracy of automatic adjustment of focus of a shooting apparatus without using a ranging sensor.

Solutions to Problems

An information processing apparatus according to one aspect of the present technology includes: a position detection section that detects a distance between a first shooting apparatus and a shooting target on the basis of a positional relationship among the first shooting apparatus, a second shooting apparatus, and the shooting target, which is a target to be focused; and a focus control section that controls focus of the first shooting apparatus on the basis of a distance between the first shooting apparatus and the shooting target.

An information processing method according to one aspect of the present technology includes: detecting a distance between a first shooting apparatus and a shooting target on the basis of a positional relationship among the first shooting apparatus, a second shooting apparatus, and the shooting target; and controlling focus of the first shooting apparatus on the basis of a distance between the first shooting apparatus and the shooting target.

A program according to one aspect of the present technology causes a computer to execute processing of detecting a distance between a first shooting apparatus and a shooting target on the basis of a positional relationship among the first shooting apparatus, a second shooting apparatus, and the shooting target, and controlling focus of the first shooting apparatus on the basis of a distance between the first shooting apparatus and the shooting target.

In one aspect of the present technology, a distance between a first shooting apparatus and a shooting target is detected on the basis of a positional relationship among the first shooting apparatus, a second shooting apparatus, and the shooting target, and focus of the first shooting apparatus is controlled on the basis of a distance between the first shooting apparatus and the shooting target.

MODE FOR CARRYING OUT THE INVENTION

Nodes for carrying out the present technology (hereinafter, referred to as embodiments) will be described below. The description will be given in the following order.

1. Embodiments
2. Modifications
3. Others

1. Embodiments

<Configuration of Information Processing System 1>

Figure 1:
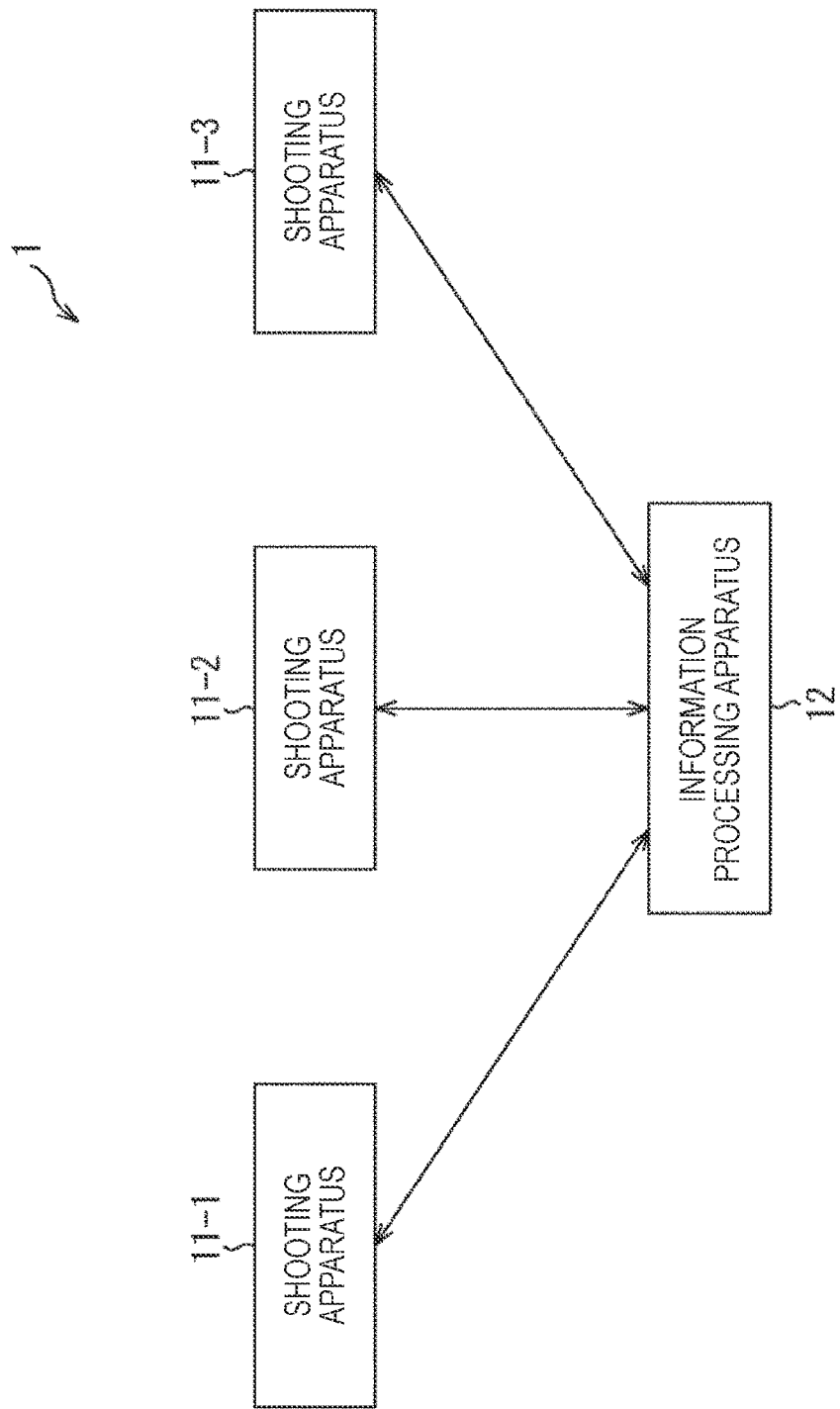
FIG. 1 is a block diagram illustrating a configuration example of an information processing system to which the present technology is applied.

FIG. 1 illustrates a configuration example of an embodiment of an information processing system 1 to which the present technology is applied.

The information processing system 1 includes shooting apparatuses 11-1 to 11-3 and an information processing apparatus 12. The shooting apparatuses 11-1 to 11-3 and the information processing apparatus 12 are connected to one another via a network configured in a wired or/and wireless manner, and exchange various data.

Note that, hereinafter, in a case where it is not necessary to individually distinguish the shooting apparatuses 11-1 to 11-3, they are simply referred to as shooting apparatus 11.

Furthermore, FIG. 1 illustrates a case where three shooting apparatuses 11 are installed, but the present technology can be applied as long as there are at least two shooting apparatuses 11, and can also be applied to a case where there are four or more shooting apparatuses 11.

The shooting apparatus 11 shoots a still image or a moving image, and transmits image data corresponding to the shot still image or moving image to the information processing apparatus 12.

Note that the shooting apparatus 11 only needs to include at least a focus automatic adjustment function to be described later, and a method and a type thereof are not particularly limited.

Furthermore, in the following description, the image represents an image for one frame constituting a still image or a moving image shot by the shooting apparatus 11.

By analyzing an image shot by each of the shooting apparatuses 11, the information processing apparatus 12 detects a positional relationship between each of the shooting apparatuses 11 and a subject (shooting target) to be a target to be focused by each of the shooting apparatuses 11. Furthermore, the information processing apparatus 12 adjusts focus of each of the shooting apparatuses 11 on the basis of the positional relationship between each of the shooting apparatuses 11 and the shooting target.

<Configuration Example of Shooting Apparatus 11>

Figure 2:
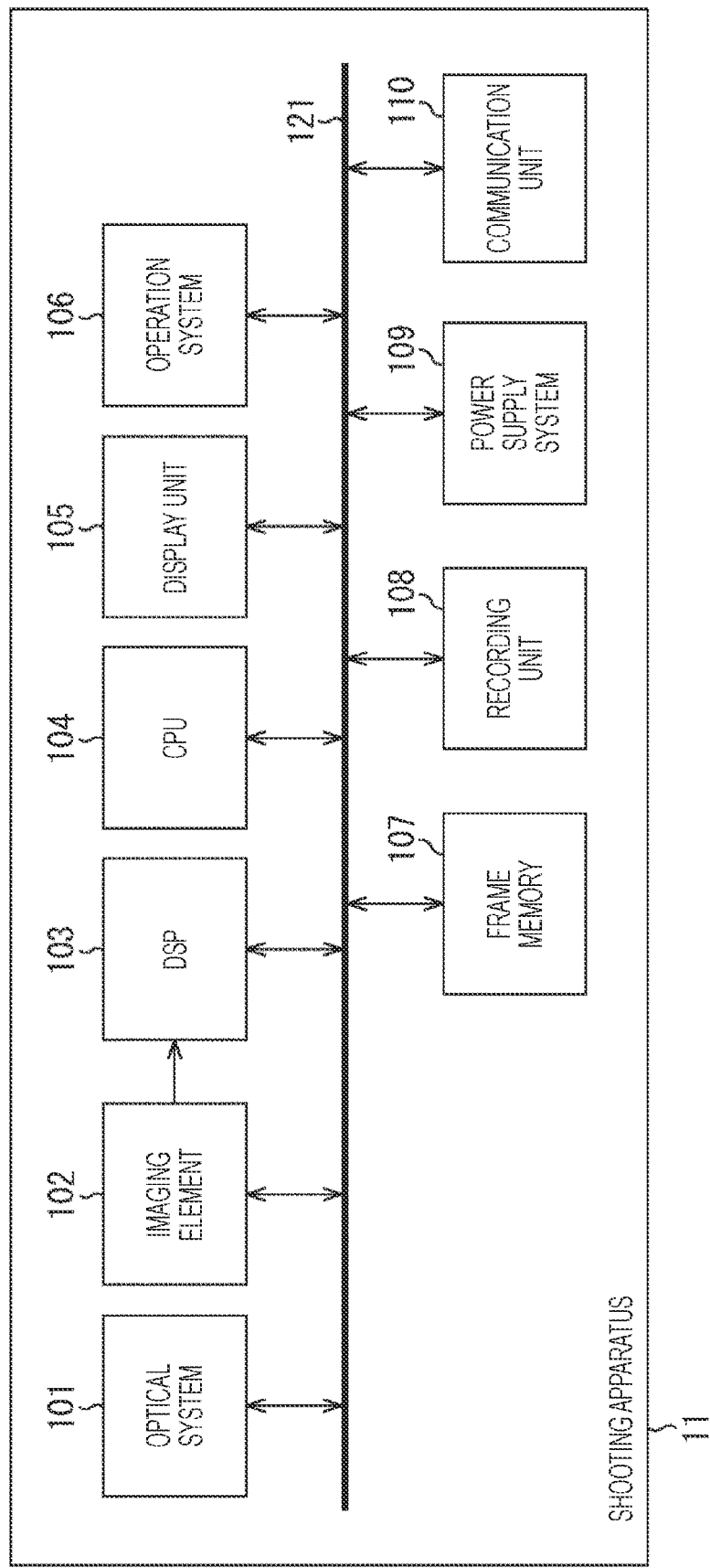
FIG. 2 is a block diagram illustrating a configuration example of a shooting apparatus.

FIG. 2 illustrates a configuration example of the shooting apparatus 11.

The shooting apparatus 11 includes an optical system 101, an imaging element 102, a digital signal processor (DSP) 103, a central processing unit (CPU) 104, a display unit 105, an operation system 106, a frame memory 107, a recording unit 108, a power supply system 109, a communication unit 110, and the like. The optical system 101 to the communication unit 110 are connected to one another via a bus 121.

The optical system 101 includes a lens system and the like, captures incident light (image light) from the subject, and forms an image of the subject on an imaging surface of the imaging element 102. Furthermore, the optical system 101 is driven by the CPU 104 to adjust focus of the shooting apparatus 11.

The imaging element 102 converts the amount of incident light incident on the imaging surface by the optical system 101 into an electrical signal in units of pixels, and supplies it to the DSP 103 as a pixel signal.

Note that an imaging element of discretionary type can be used as the imaging element 102.

The DSP 103 performs various processing on the pixel signal supplied from the imaging element 102, and generates, on the frame memory 107, image data corresponding to the image shot by the imaging element 102.

The CPU 104 controls each unit of the shooting apparatus 11.

The display unit 105 includes a panel type display unit such as a liquid crystal display unit or an organic electro luminescence (EL) display unit, for example. The display unit 105 displays a still image or a moving image shot by, for example, the imaging element 102, an operation screen, and the like.

The operation system 106 includes, for example, various operation devices and is used for operation of the shooting apparatus 11. The operation system 106 generates and outputs, to the bus 121, an operation signal based on a user operation.

The recording unit 108 records image data or the like, for example, generated by the DSP 103 onto a recording medium such as a hard disk drive (HDD) or a digital versatile disk (DVD).

The power supply system 109 supplies power necessary for the operation of each unit of the shooting apparatus 11.

The communication unit 110 communicates with the information processing apparatus 12 by a predetermined communication method.

Note that, hereinafter, description of the bus 121 in a case where each unit exchanges data and the like via the bus 121 in the shooting apparatus 11 is omitted. For example, in a case where the CPU 104 and the communication unit 110 perform communication via the bus 121, the description of the bus 121 is omitted, and it is described simply that the CPU 104 and the communication unit 110 perform communication.

<Configuration Example of Information Processing Section 151>

Figure 3:
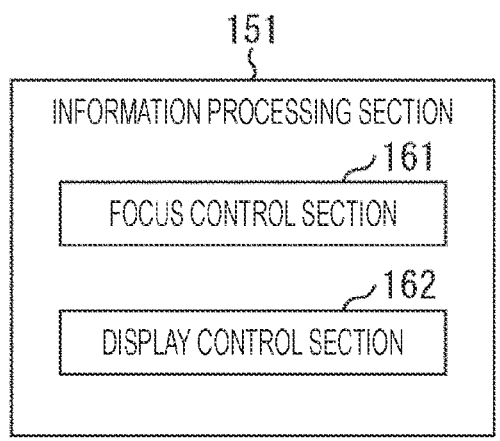
FIG. 3 is a block diagram illustrating a configuration example of an information processing section of the shooting apparatus.

FIG. 3 illustrates a configuration example of the information processing section 151, which is a function implemented by the CPU 104 executing a program.

The information processing section 151 includes a focus control section 161 and a display control section 162.

The focus control section 161 adjusts focus of the shooting apparatus 11 by driving the optical system 101 on the basis of, for example, a focus control signal received from the information processing apparatus 12, an auto focus (AF) function included in the focus control section 161, or ac operation signal supplied from the operation system 106.

The display control section 162 controls display of various images by the display unit 105.

<Configuration Example of Information Processing Apparatus 12>

Figure 4:
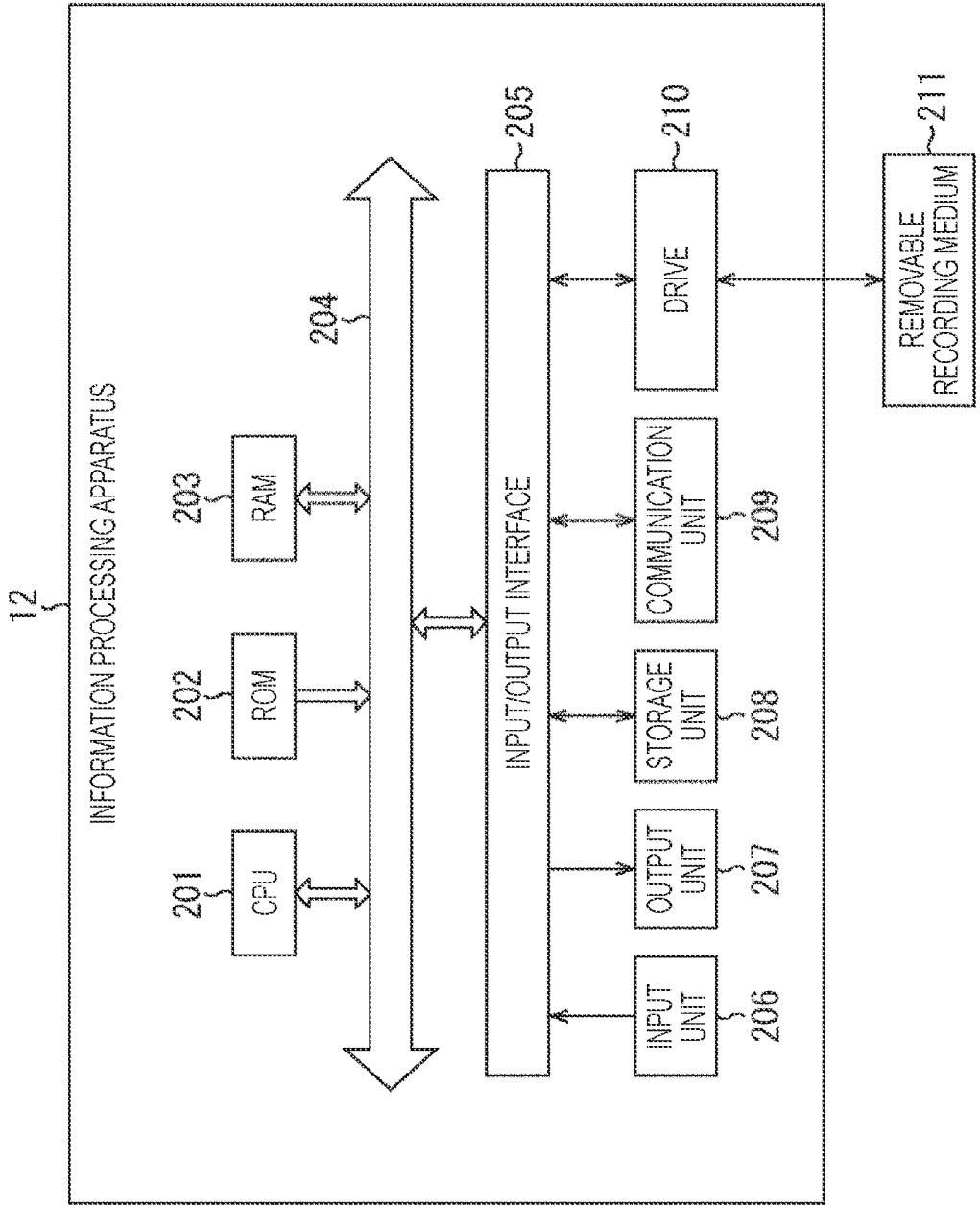
FIG. 4 is a block diagram illustrating a configuration example of an information processing apparatus.

FIG. 4 illustrates a configuration example of hardware of the information processing apparatus 12.

The information processing apparatus 12 includes, for example, a computer. In the information processing apparatus 12, a CPU 201, a read only memory (ROM) 202, and a random access memory (RAM) 203 are connected to one another via a bus 204. An input/output interface 205 is further connected to the bus 204. An input unit 206, an output unit 207, a storage unit 208, a communication unit 209, and a drive 210 are connected to the input/output interface 205.

The input unit 206 includes, for example, a keyboard, a mouse, a microphone, and the like.

The output unit 207 includes, for example, a display, a speaker, and the like.

The storage unit 208 includes, for example, a nonvolatile memory such as a hard disk.

The communication unit 209 communicates with each of the shooting apparatuses 11 by a predetermined communication method.

The drive 210 drives a removable recording medium 211 such as a magnetic disk, an optical disk, a magneto-optical disk, or a semiconductor memory.

Note that the program executed by the information processing apparatus 12 (CPU 201) can be provided by being recorded in the removable recording medium 211 as a package media or the like, for example. The program recorded in the removable recording medium 211 is installed in the storage unit 208 via the input/output interface 205, for example, by attaching the removable recording medium 211 to the drive 210.

Furthermore, the program is received by the communication unit 209 via a wired or wireless transmission medium such as a local area network, the Internet, or digital satellite broadcasting, for example, and is installed in the storage unit 208.

Moreover, the program can be installed in advance in the ROM 202 or the storage unit 208, for example.

Then, in the information processing apparatus 12, for example, the CPU 201 loads a program stored in the ROM 202 or the storage unit 208 into the RAM 203 via the input/output interface 205 and the bus 204 and executes the program, thereby performing a series of processing.

Note that, hereinafter, description of the bus 204 and the input/output interface 205 in a case where each unit exchanges data and the like via the bus 204 and the input/output interface 205 in the information processing apparatus 12 is omitted. For example, in a case where the CPU 201 and the communication unit 209 perform communication via the bus 204 and the input/output interface 205, the description of the bus 204 and the input/output interface 205 is omitted, and it is described simply that the CPU 201 and the communication unit 209 perform communication.

<Configuration Example of Information Processing Section 251>

Figure 5:
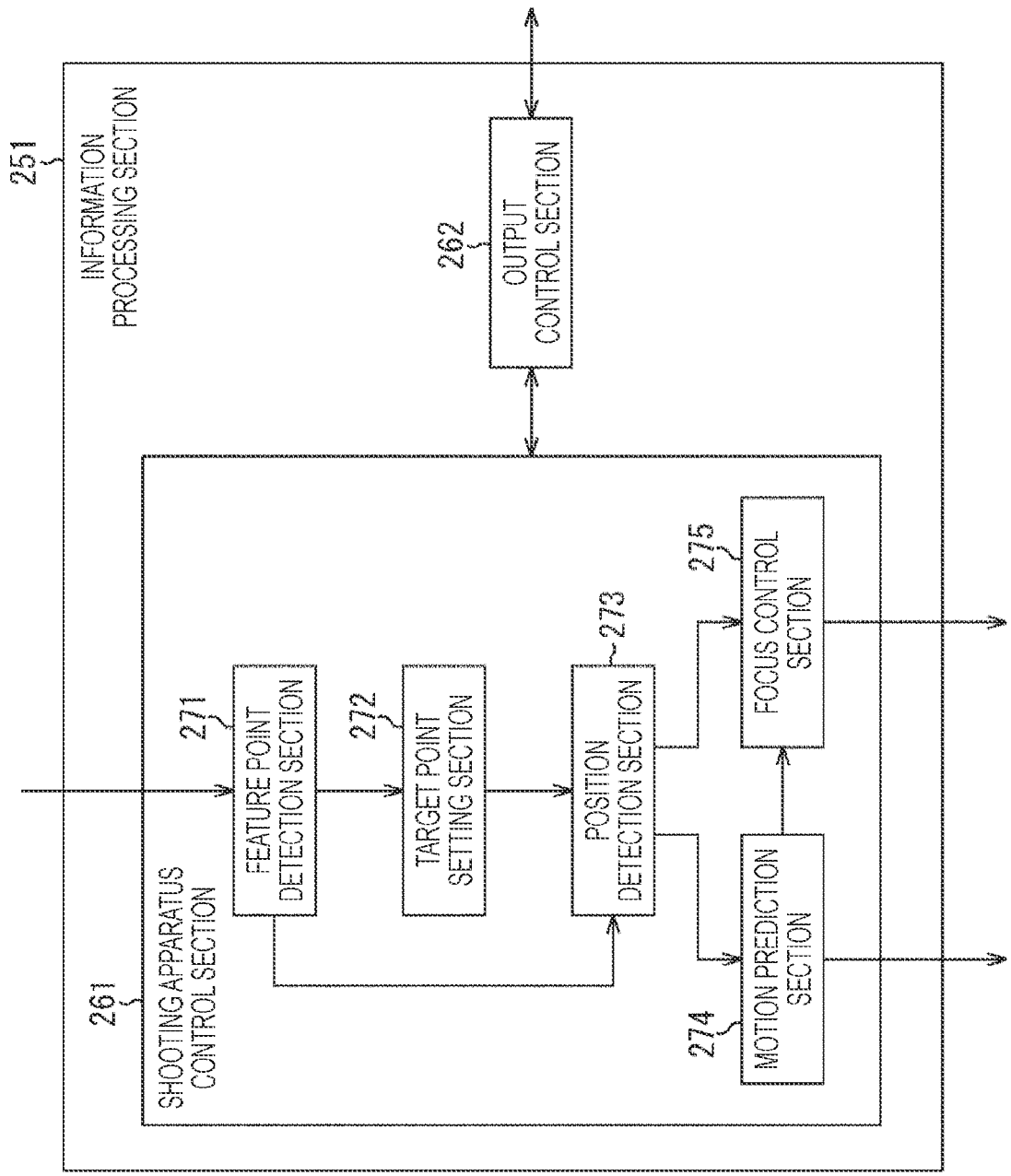
FIG. 5 is a block diagram illustrating a configuration example of an information processing section of the information processing apparatus.

FIG. 5 illustrates a configuration example of the information processing section 251, which is a function implemented by the CPU 201 executing a program.

The information processing section 251 includes a shooting apparatus control section 261 and an output control section 262. The shooting apparatus control section 261 includes a feature point detection section 271, a target point setting section 272, a position detection section 273, a motion prediction section 274, and a focus control section 275.

The feature point detection section 271 detects a feature point of an image shot by each of the shooting apparatuses 11. The feature point detection section 271 supplies data indicating the detection result of the feature point of each image to the target point setting section 272 and the position detection section 273.

The target point setting section 272 sets, from among the feature points of each image, a target point that is a part (hereinafter, referred to as target part) to become the target to be focused in the shooting target. The target point setting section 272 supplies data indicating a setting result of the target point to the position detection section 273.

The position detection section 273 detects a positional relationship between each of the shooting apparatuses 11 on the basis of the feature point of the image shot by the each of the shooting apparatuses 11. Furthermore, the position detection section 273 detects the positional relationship between each of the shooting apparatuses 11 and the shooting target on the basis of the positional relationship between each of the shooting apparatuses 11 and the target point having been set. The position detection section 273 supplies, to the motion prediction section 274 and the focus control section 275, data indicating the detection result of the positional relationship between each of the shooting apparatuses 11 and the shooting target.

The motion prediction section 274 predicts the motion of the shooting target with respect to each of the shooting apparatuses 11 on the basis of transition of the positional relationship between each of the shooting apparatuses 11 and the shooting target. The motion prediction section 274 supplies, to the focus control section 275, data indicating the prediction result of the motion of the shooting target with respect to each of the shooting apparatuses 11. Furthermore, the motion prediction section 274 transmits, to each of the shooting apparatuses 11 via the communication unit 209, data indicating the prediction result of the motion of the shooting target with respect to each of the shooting apparatuses 11.

The focus control section 275 adjusts focus of each of the shooting apparatuses 11. On the basis of the positional relationship between each of the shooting apparatuses 11 and the shooting target, particularly, the distance between each of the shooting apparatuses 11 and the shooting target, for example, the focus control section 275 generates, for each of the shooting apparatuses 11, a focus control signal for each of the shooting apparatuses 11 to focus on the shooting target. The focus control section 275 transmits, to each of the shooting apparatuses 11 via the communication unit 209, a focus control signal for each of the shooting apparatuses 11.

Furthermore, the focus control section 275 controls, as necessary, the timing of adjusting focus of each of the shooting apparatuses 11 on the basis of the prediction result of the motion of the shooting target with respect to each of the shooting apparatuses 11.

The output control section 262 controls output of an image, sound, and the like by the output unit 207.

<Processing of Information Processing Apparatus 12>

Next, processing of the information processing apparatus 12 will be described.

<Position Detection Processing>

First, position detection processing executed by the information processing apparatus 12 will be described with reference to the flowchart of FIG. 6.

In step S101, the information processing apparatus 12 acquires image data from each of the shooting apparatuses 11. Specifically, the communication unit 209 receives image data from each of the shooting apparatuses 11 and supplies the image data to the feature point detection section 271.

Note that the image data acquired from each of the shooting apparatuses 11 is desirably image data corresponding to images shot at timing as close as possible (ideally simultaneously) to one another.

In step S102, the feature point detection section 271 detects a feature point of each image, that is, an image based on image data acquired from each of the shooting apparatuses 11.

For example, the feature point detection section 271 detects, as a feature point, a part representing a physical feature of a human appearing in each image. For example, the feature point detection section 271 detects a human joint and physical feature points such as eyes and a nose other than the human joint. Specifically, as feature points, the feature point detection section 271 detects, for example, a human's left shoulder, right shoulder, left elbow, right elbow, left wrist, right wrist, finger joint, fingertip, left waist, right waist, left knee, right knee, left ankle, right ankle, top of head, neck, right eye, left eye, nose, mouth, right ear, left ear, and the like.

Note that the parts mentioned here as physical features are examples, and can be added, deleted, or changed as necessary.

Furthermore, the feature point may be, for example, a region having a certain size or a line segment such as an edge. For example, in a case where the eye is detected as a feature point, any of the center of the eye (the center of the iris), the eyeball, or the boundary (edge) between the eyeball and the eyelid can be the feature point.

Note that the feature point detection section 271 may detect a feature point corresponding to a user operation, or may detect a feature point using a predetermined algorithm, for example.

In the former case, for example, while viewing an image displayed on the display included in the output unit 207, the user operates an operation device such as a mouse included in the input unit 206 to designate a desired part in the image. Then, the feature point detection section 271 detects, as the feature point, the part designated by the user.

In the latter case, for example, the feature point detection section 271 detects the feature point by applying a technology called Open Pose, which is described in "Zhe Cao et al., "Realtime Multi-Person 2D Pose Estimation using Part Affinity Fields", CVPR 2017" (hereinafter, referred to as Non-Patent Document 1).

The technology described in Non-Patent Document 1 is a technology for estimating the posture of a human, and detects a part (for example, a joint or the like) having a physical feature of the human described above in order to estimate the posture. For example, in the technology described in Non-Patent Document 1, the joint position is estimated from one image using deep learning, a confidence map is obtained for each joint, and posture information based on the skeleton of a human is obtained by connecting the joints.

Note that the feature point detection section 271 may detect a feature point using a technology other than that of Non-Patent Document 1.

Furthermore, for example, the feature point detection section 271 may detect a feature point by combining the both. For example, first, the feature point detection section 271 may detect a feature point by image analysis using a predetermined algorithm, and the user may verify the detected feature point and instruct addition, deletion, or the like of the feature point.

The feature point detection section 271 supplies data indicating the detection result of the feature point of each image to the position detection section 273.

In step S103, the position detection section 273 detects the positional relationship between each of the shooting apparatuses 11.

Specifically, the position detection section 273 detects a relative positional relationship of each of the shooting apparatuses 11-1 and the shooting apparatus 11-2 on the basis of a feature point detected from an image shot by the shooting apparatus 11-1 and a feature point detected from an image shot by the shooting apparatus 11-2. For example, the position detection section 273 detects the position and orientation (posture) of the shooting apparatus 11-2 with respect to the shooting apparatus 11-1 when the shooting apparatus 11-1 is set as a reference.

For example, as the position and orientation of the shooting apparatus 11-2 with respect to the shooting apparatus 11-1, the position detection section 273 calculates an external parameter for converting the camera coordinate system of the shooting apparatus 11-1 into the camera coordinate system of the shooting apparatus 11-2 (hereinafter, referred to as external parameter of the shooting apparatus 11-2). This external parameter includes a rotation vector and a translation vector. The rotation vector represents the orientation of the optical axis of the shooting apparatus 11-2 in the camera coordinate system of the shooting apparatus 11-1, and the translation vector represents the position of the focal point of the shooting apparatus 11-2 in the camera coordinate system of the shooting apparatus 11-1.

This external parameter can be obtained using an algorithm called an eight-point algorithm, for example.

Figure 7:
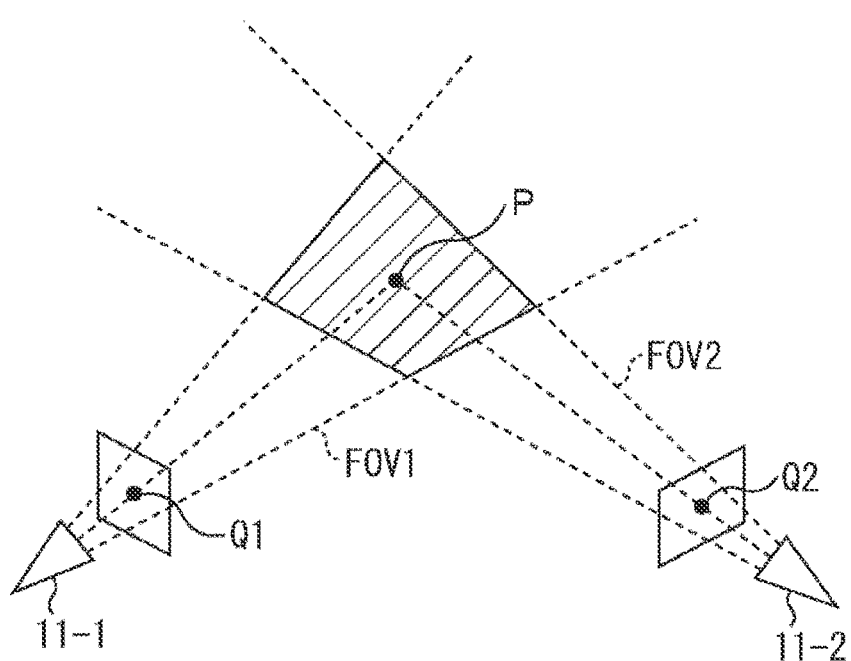
FIG. 7 is a view for explaining a calculation method of external parameters of the shooting apparatus.

Here, as illustrated in FIG. 7, projection points on the image plane of each of the shooting apparatuses 11 when a point P existing in a field of view FOV1 of the shooting apparatus 11-1 and a field of view FOV2 of the shooting apparatus 11-2 in a three-dimensional space is shot by the shooting apparatus 11-1 and the shooting apparatus 11-2 are $Q_1$ and $Q_2$, respectively. In this case, the following relational expression (1) is established between the projection point $Q_1$ and the projection point $Q_2$.

$$Q_1^T F Q_2 = 0 \quad (1)$$

Here, a matrix F is a fundamental matrix. The fundamental matrix F can be obtained by preparing eight or more pairs of projection points (for example, $(Q_1, Q_2)$) when points is the three-dimensional space are shot by each of the shooting apparatuses 11 and applying the eight-point algorithm.

Moreover, Expression (1) can be developed into the following Expression (2) using an internal parameter K1 unique to the shooting apparatus 11-1 such as a focal length and an image center, an internal parameter K2 unique to the shooting apparatus 11-2, and an essential matrix E.

$$Q_1^T K_1^{-T} E K_2 Q_2 = 0 \quad (2)$$

Moreover, Expression (2) can be developed into the following Expression (3).

$$E = K_1^T F K_2^{-1} \quad (3)$$

In a case where the internal parameters ($K_1$, $K_2$) are known, the essential matrix E can be calculated by using the pair of projection points described above. Moreover, the essential matrix E can be decomposed into external parameters by performing singular value decomposition. Furthermore, in a case where a vector representing the point P in the camera coordinate system of the shooting apparatus 11-1 is $P_1$ and a vector representing the point P in the camera coordinate system of the shooting apparatus 11-2 is $P_2$, the essential matrix E satisfies the following Expression (4).

$$P_1^T E P_2 = 0 \quad (4)$$

Therefore, the essential matrix E can be obtained by applying the eight-point algorithm with respect to a pair of vectors (for example, $(P_1, P_2)$) with respect to points in the three-dimensional space or a pair of projection points (for example, $(Q_1, Q_2)$). Then, by performing singular value decomposition on the essential matrix E, the external parameter of the shooting apparatus 11-2 can be obtained. This external parameter represents the position and orientation of the shooting apparatus 11-2 with respect to the shooting apparatus 11-1.

By a similar method, on the basis of the feature point detected from the image shot by the shooting apparatus 11-1 and the feature point detected from the image shot by the shooting apparatus 11-3, the position detection section 273 detects the position and orientation of the shooting apparatus 11-3 with respect to the shooting apparatus 11-1 when the shooting apparatus 11-1 is used as a reference.

Then, the position detection section 273 detects the positional relationship between each of the shooting apparatuses 11 by integrating the position and orientation of the shooting apparatus 11-2 with respect to the shooting apparatus 11-1 and the position and orientation of the shooting apparatus 11-2 with respect to the shooting apparatus 11-1. The positional relationship between each of the shooting apparatuses 11 is represented by, for example, the positions and orientations of the shooting apparatus 11-2 and the shooting apparatus 11-3 in the camera coordinate system of the shooting apparatus 11-1.

Note that, for example, the position detection section 273 may convert the coordinate system representing the positional relationship between each of the shooting apparatuses 11 from the camera coordinate system of the shooting apparatus 11-1 to the world coordinate system.

Thereafter, the position detection processing ends.

As described above, the positional relationship between each of the shooting apparatuses 11 is detected only on the basis of the image shot by each of the shooting apparatuses 11. Furthermore, the distance and orientation between each of the shooting apparatuses 11 are obtained on the basis of the positional relationship of each of the shooting apparatuses 11. Note that the distance between each of the shooting apparatuses 11 is represented by, for example, a distance between focal points of each of the shooting apparatuses 11. The orientation between each of the shooting apparatuses 11 is represented by, for example, an angle between optical axes of each of the shooting apparatuses 11.

Furthermore, for example, by repeatedly executing this position detection processing, even in a case where at least one shooting apparatus 11 moves and the positional relationship of each of the shooting apparatuses 11 changes, the positional relationship of each of the shooting apparatuses 11 can be accurately detected. In this case, for example, by smoothing, in the time direction, the external parameter of each of the shooting apparatuses 11 having been calculated, it is possible to improve the detection accuracy of the positional relationship of each of the shooting apparatuses 11.

First Embodiment of Focus Control Processing

Next, a first embodiment of focus control processing executed by the information processing apparatus 12 will be described with reference to the flowchart of FIG. 8.

This first embodiment is processing in a case of focusing on a shooting target existing within the fields of view (shooting ranges) of two or more shooting apparatuses 11.

Figure 9:
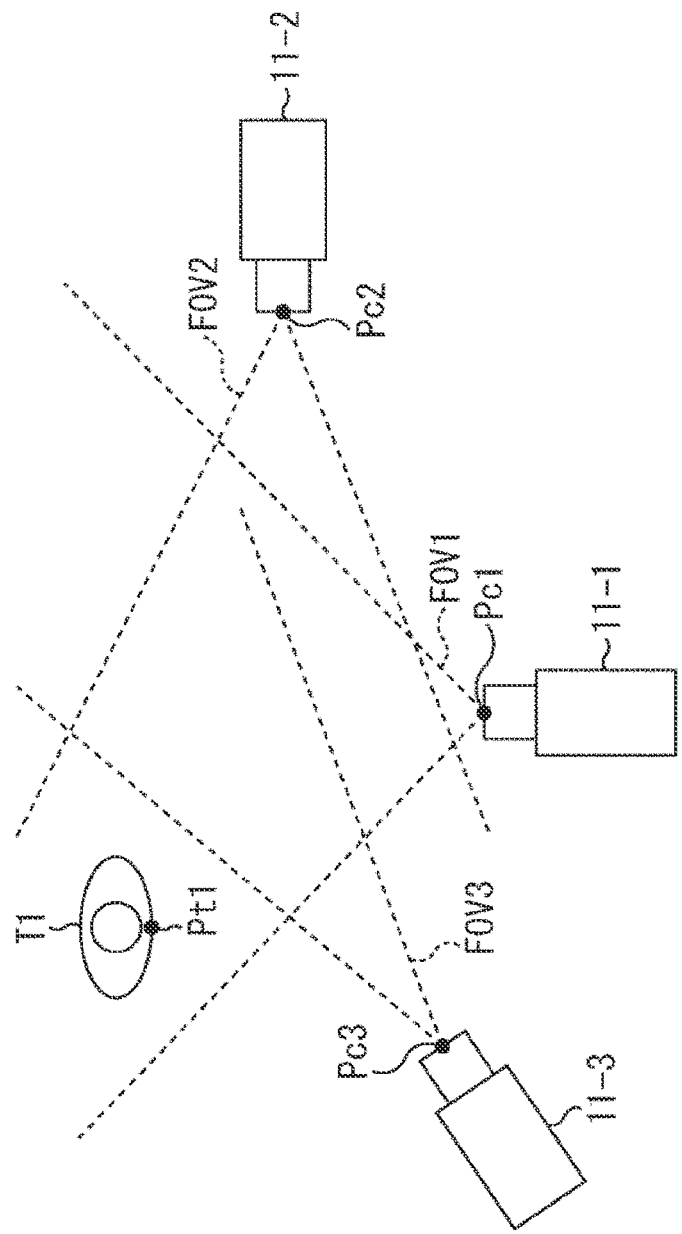
FIG. 9 is a view illustrating an example of a positional relationship between each shooting apparatus and a shooting target.

Hereinafter, a case where the positional relationship between the shooting apparatuses 11-1 to 11-3 and a shooting target T1, which is a human, is illustrated in FIG. 9 will be described as a specific example.

In this example, the shooting target T1 exists in the field of view FOV1 of the shooting apparatus 11-1 and in the field of view FOV2 of the shooting apparatus 11-2. On the other hand, the shooting target T1 exists outside a field of view FOV3 of the shooting apparatus 11-3.

Note that it is assumed that the positional relationship between each of the shooting apparatuses 11, more specifically, a position Pc1 and orientation of the shooting apparatus 11-1, a position Pc2 and orientation of the shooting apparatus 11-2, and a position Pc3 and orientation of the shooting apparatus 11-3 are known by the position detection processing described above with reference to FIG. 6. Therefore, the distance and orientation between each of the shooting apparatuses 11 can be calculated on the basis of the positional relationship between each of the shooting apparatuses 11.

Figure 6:
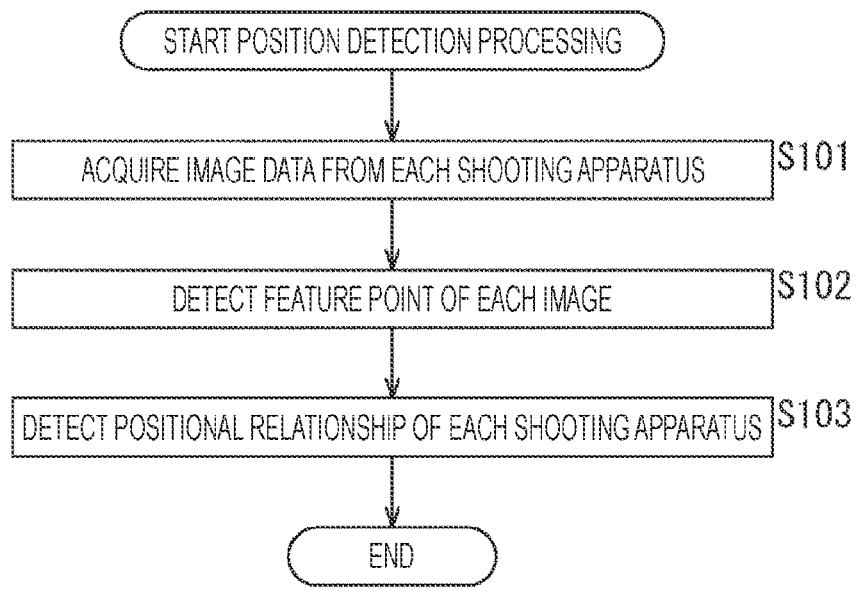
FIG. 6 is a flowchart for explaining position detection processing.

In step S151, image data is acquired from each shooting apparatus by processing similar to that in step S101 in FIG. 6.

In step S152, similarly, to the processing in step S102 in FIG. 6, the feature point detection section 271 detects a feature point of an image shot by each of the shooting apparatuses 11. The feature point detection section 271 supplies data indicating the detection result of the feature point to the target point setting section 272.

In step S153, the target point setting section 272 sets a target point to be focused.

Here, for example, the target point setting section 272 may set the target point on the basis of a user operation, or may set the target point on the basis of a predetermined condition.

In the former case, for example, under the control of the output control section 262, the display included in the output unit 207 displays each image and the detection result of the feature point of each image.

On the other hand, the user operates an input device such as the mouse included in the input unit 206, and selects one feature point on which each of the shooting apparatuses 11 is desired to focus from among the displayed feature points. At this time, for example, the range in which the target point can be selected is limited to feature points detected in two or more images. Therefore, feature points detected only in one image are excluded from the selection range of the target point. Then, the target point setting section 272 sets the feature point selected by the user as the target point.

In the latter case, for example, the target point setting section 272 sets, as the target point, a feature point satisfying a predetermined condition from among feature points detected in two or more images. For example, the target point setting section 272 sets, as the target point, a feature point corresponding to a predetermined site (for example, right eye) or the human closest to the shooting apparatus 11-1 from, among the feature points detected in two or more images.

Note that, in the latter case, for example, the target point set by the target point setting section 272 on the basis of the predetermined condition may be verified by the user and may be made changeable as necessary.

Then, the subject including the set target point becomes the shooting target.

The target point setting section 272 supplies data indicating a setting result of the target point to the position detection section 273.

Note that, hereinafter, as illustrated in FIG. 9, it is assumed that a feature point Pt1 of the shooting target T1 (hereinafter, referred to as target point Pt1) is set as a target point.

In step S154, the position detection section 273 detects the subject distance of each of the shooting apparatuses 11.

For example, by the following method, the position detection section 273 detects the subject distance of the shooting target T1 with respect to the shooting apparatus 11-1 and the subject distance of the shooting target T1 with respect to the shooting apparatus 11-2 on the basis of the positional relationship among the shooting apparatus 11-1, the shooting apparatus 11-2, and the shooting target T1.

Figure 10:
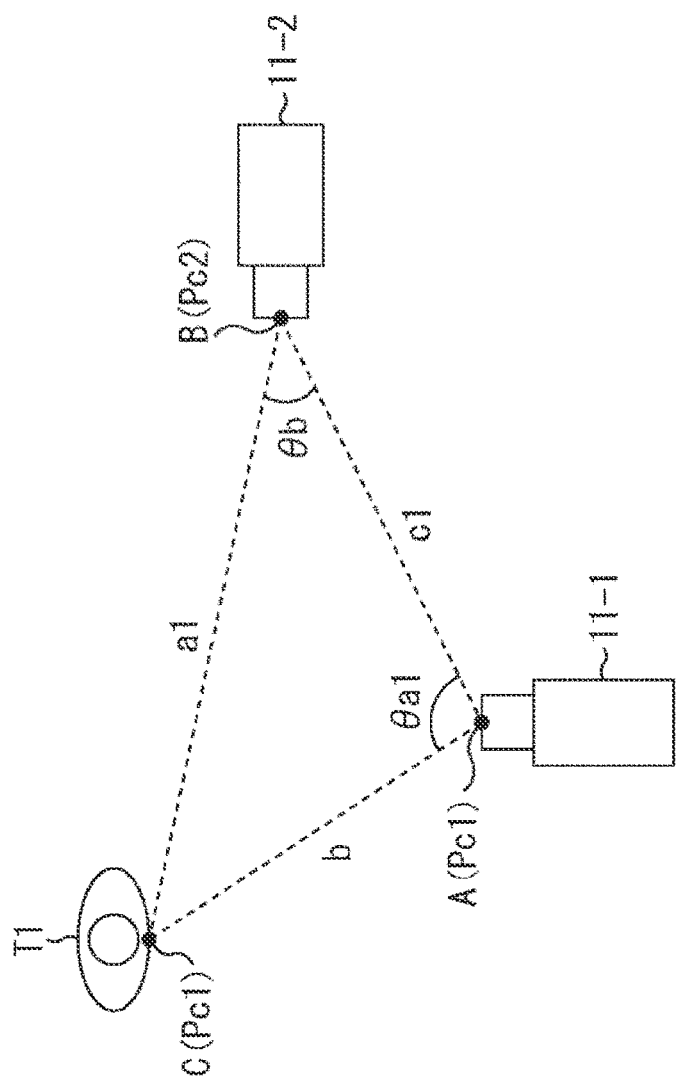
FIG. 10 is a view for explaining a calculation method of a subject distance.

Here, as illustrated in FIG. 10, with the position Pc1 (focal point) of the shooting apparatus 11-1 as a point A, the position Pc2 (focal point) of the shooting apparatus 11-2 as a point B, and the target point Pt1 of the shooting target T1 as a point C, a triangle ABC connecting the point A, the point B, and the point C is considered.

Note that, hereinafter, the length of a side AB is c1. The length c1 is equal to the distance between the position Pc1 and the position Pc2, and represents the distance between the shooting apparatus 11-1 and the shooting apparatus 11-2. Hereinafter, the length of a side BC is a1. The length a1 is equal to the distance between the position Pc2 and the target point Pt1, and represents the subject distance of the shooting target T1 with respect to the shooting apparatus 11-2. Hereinafter, the length of a side CA is b. The length b is equal to the distance between the target point Pt1 and the position Pc1, and represents the subject distance of the shooting target T1 with respect to the shooting apparatus 11-1.

Furthermore, hereinafter, the angle of an angle CAB, that is, the angle between the side CA and the side AB is θa1. The angle θa1 is equal to the angle between the direction of the target point Pt1 and the direction of the position Pc2 with respect to the position Pc1, and represents the angle between the direction of the shooting target T1 and the direction of the shooting apparatus 11-2 with respect to the shooting apparatus 11-1. Hereinafter, the angle of an angle ABC, that is, the angle between the side AB and the side BC is θb. The angle θb is equal to the angle between the direction of the position Pc1 and the direction of the target point Pt1 with respect to the position Pc2, and represents the angle between the direction of the shooting apparatus 11-1 and the direction of the shooting target T1 with respect to the shooting apparatus 11-2.

Here, since the position Pc1 and the position Pc2 are known, the length c1 of the side AB can be calculated. Therefore, if the angle θa1 and the angle θb at both ends of the side AB are known, the shape and size of the triangle ABC are uniquely determined. That is, the positional relationship among the position Pc1, the position Pc2, and the target point Pt1 (positional relationship among the shooting apparatus 11-1, the shooting apparatus 11-2, and the shooting target T1) is uniquely determined.

Figure 11:
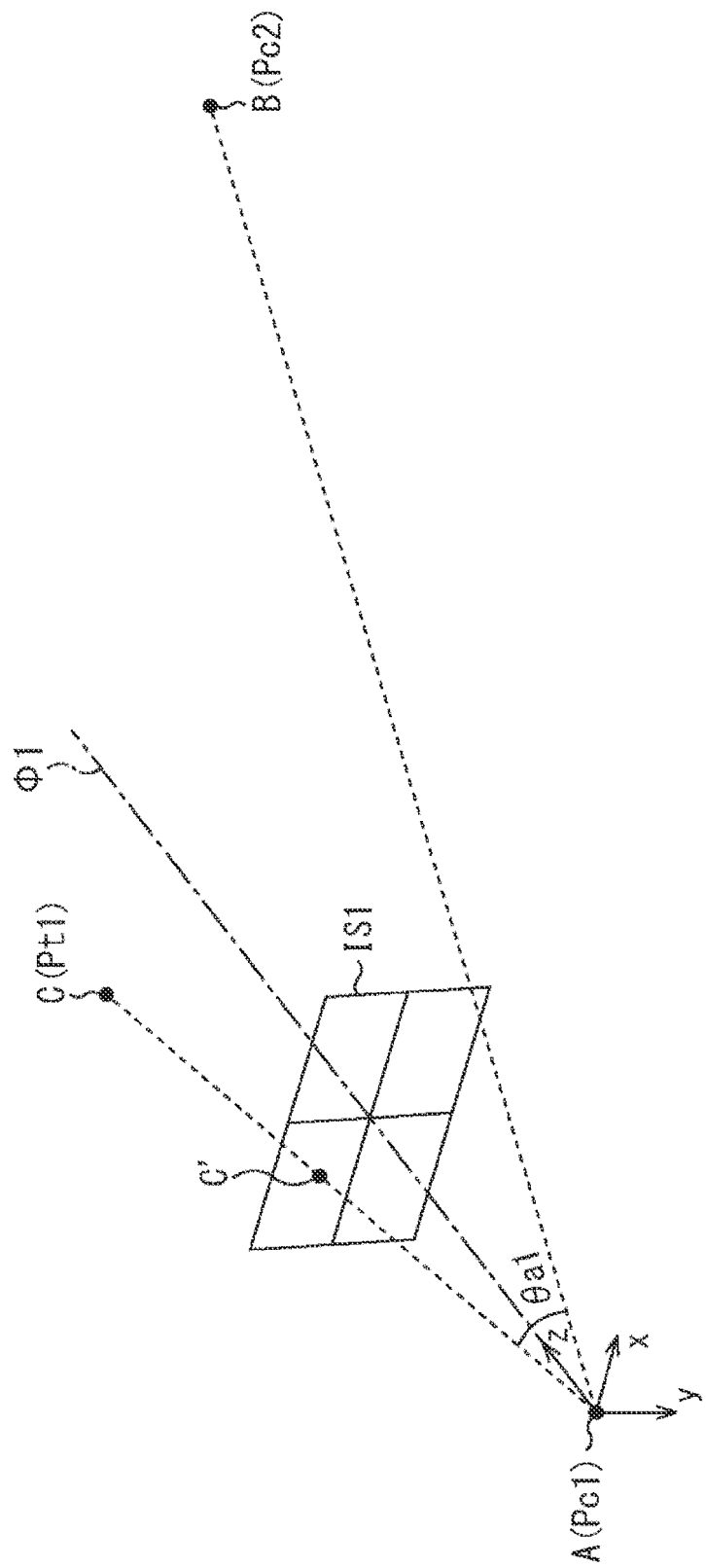
FIG. 11 is a view for explaining the calculation method of the subject distance.

For example, as illustrated in FIG. 11, a local coordinate system is considered, in which the horizontal direction of an imaging surface IS1 of the imaging element 102 of the shooting apparatus 11-1 is an x axis, the vertical direction is a y axis, and the direction of an optical axis Φ1 is a z axis.

Note that, for easy understanding of the drawing, FIG. 11 illustrates the positional relationship of the imaging surface IS1 with the point A (focal point of the shooting apparatus 11-1) in reverse. In reality, the point A exists between the point C and the imaging surface IS1.

A direction vector Vac representing the direction of the shooting target T1 with respect to the shooting apparatus 11-1 is equal to a vector passing through a point C' corresponding to the point C on the imaging surface IS1 and the focal point (point A) of the shooting apparatus 11-1. Therefore, the direction vector Vac can be easily calculated by detecting a point corresponding to the point C' in the image shot by the shooting apparatus 11-1.

Furthermore, a direction vector Vab representing the direction of the shooting apparatus 11-2 with respect to the shooting apparatus 11-1 is equal to a vector passing through the focal point (point A) of the shooting apparatus 11-1 and the focal point (point B) of the shooting apparatus 11-2. Therefore, since the position (position Pc1) of the point A and the position (position Pc2) of the point B are known, the direction vector Vab can be calculated.

Then, the angle θa1 in the global coordinate system is equal to the angle formed by the vector Vac and the vector Vab in the local coordinate system. Therefore, the angle θa1 is calculated by the following Expression (5) using the formula of the inner product of the vectors.

$$\theta a1 = \cos^{-1}(Vac \cdot Vab) \quad (5)$$

Note that Vac·Vab represents an inner product of the direction vector Vac and the direction vector Vab.

Similarly, the angle θb is calculated by the following Expression (6) using a direction vector Vbc representing the direction of the shooting target T1 with respect to the shooting apparatus 11-2 and a vector Vba representing the direction of the shooting apparatus 11-1 with respect to the shooting apparatus 11-2.

$$\theta b = \cos^{-1}(Vbc \cdot Vba) \quad (6)$$

Note that Vbc·Vba represents an inner product of the direction vector Vbc and the direction vector Vba.

Then, on the basis of the length c1 of the side AB, the angle θa1, and the angle θb, the length b of the side CA is calculated by the following. Expression (7) using the sine law.

$$b = c1 \times \sin(\theta b)/\sin(\pi - \theta b - \theta a1) \quad (7)$$

Similarly, on the basis of the length c1 of the side AB, the angle θa1, and the angle θb, the length a1 of the side BC is calculated by the following Expression (8) using the sine law.

$$a1 = c1 \times \sin(\times a1)/\sin(\pi - \theta a1 - \theta b) \quad (8)$$

In this manner, the subject distance (the length b of the side CA) of the shooting target T1 with respect to the shooting apparatus 11-1 and the subject distance (the length a1 of the side BC) of the shooting target T1 with respect to the shooting apparatus 11-2 are calculated.

Furthermore, for example, the position detection section 273 detects the subject distance of the shooting target T1 with respect to the shooting apparatus 11-3 on the basis of the positional relationship among the shooting apparatus 11-1, the shooting apparatus 11-3, and the shooting target T1 by the following method. More specifically, the position detection section 273 detects the subject distance of the shooting target T1 with respect to the shooting apparatus 11-3 on the basis of the positional relationship of the shooting apparatus 11-1 with the shooting apparatus 11-3 and the positional relationship of the shooting apparatus 11-1 with the shooting target T1.

Figure 12:
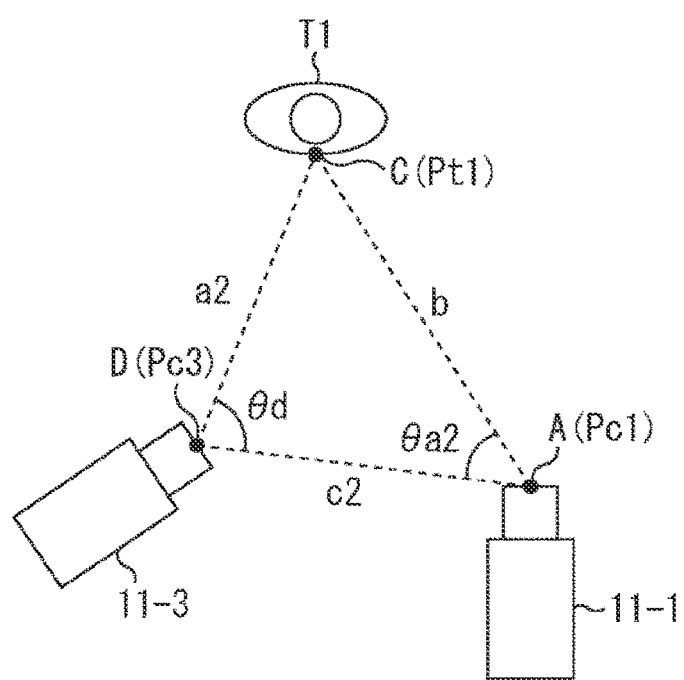
FIG. 12 is a view for explaining the calculation method of the subject distance.

Here, as illustrated in FIG. 12, with the position Pc3 of the shooting apparatus 11-3 as a point D, a triangle ADC connecting the point A, the point D, and the point C is considered. Note that, in FIG. 12, parts corresponding to those in FIG. 10 are given the same reference signs.

Note that, hereinafter, the length of a side AD is c2. The length c2 is equal to the distance between the position Pc1 and the position Pc3, and represents the distance between the shooting apparatus 11-1 and the shooting apparatus 11-3. Hereinafter, the length of a side DC is a2. The length a2 is equal to the distance between the position Pc3 and the target point Pt1, and represents the subject distance of the shooting target T1 with respect to the shooting apparatus 11-3.

Furthermore, hereinafter, the angle of an angle CAD, that is, the angle between the side CA and the side AD is $\theta a2$. The angle $\theta a1$ is equal to the angle between the direction of the target point Pt1 and the direction of the position Pc3 with respect to the position Pc1, and represents the angle between the direction of the shooting target T1 and the direction of the shooting apparatus 11-3 with respect to the shooting apparatus 11-1. Hereinafter, the angle of an angle ADC, that is, the angle between the side AD and the side DC is $\theta d$. The angle $\theta d$ is equal to the angle between the direction of the position Pc1 and the direction of the target point Pt1 with respect to the position Pc3, and represents the angle between the direction of the shooting apparatus 11-1 and the direction of the shooting target T1 with respect to the shooting apparatus 11-3.

Here, since the position Pc1 and the position Pc3 are known, the length c2 of the side AD can be calculated. Furthermore, the length b of the side CA has been calculated by the processing described above with reference to FIG. 10. Moreover, the angle $\theta a2$ of the angle CAD can be calculated by the method described above with reference to FIG. 11.

Therefore, in the triangle ADC, since the length b of the side CA, the length c2 of the side AD, and the angle $\theta a2$ of the angle CAD between the two sides are obtained, the shape and size of the triangle ADC are uniquely determined. That is, the positional relationship among the position Pc1, the position Pc3, and the target point Pt1 (positional relationship among the shooting apparatus 11-1, the shooting apparatus 11-3, and the shooting target T1) is uniquely determined.

Then, the length a2 of the side DC is calculated by the following Expression (9).

[Expression 1]

$$a2=\sqrt{b^2+c2^2-2\times b\times c2\times\cos\theta a2} \quad (9)$$

In this manner, the subject distance (the length a2 of the side DC) of the shooting target T1 with respect to the shooting apparatus 11-3 is calculated.

Note that since the shape and size of the triangle ADC are uniquely determined, the angle $\theta d$ (the angle between the direction of the shooting apparatus 11-1 and the direction of the shooting target T1 with respect to the shooting apparatus 11-3) can also be calculated.

The position detection section 273 supplies, to the focus control section 275, data indicating the detection result of the subject distance of the shooting target T1 with respect to each of the shooting apparatuses 11.

Returning to FIG. 8, in step S155, the focus control section 275 controls focus of each of the shooting apparatuses 11.

Specifically, the focus control section 275 generates, for each of the shooting apparatuses 11, a focus control signal for controlling the focus on the shooting target T1 (more strictly, the target point Pt1 of the shooting target T1). The focus control section 275 transmits the focus control signal to each of the shooting apparatuses 11 via the communication unit 209.

On the other hand, on the basis of the focus control signal, the focus control section 161 of each of the shooting apparatuses 11 drives the optical system 101 to focus on the shooting target T1 (more strictly, the target point Pt1 of the shooting target T1).

For example, the focus control signal includes a setting value of the optical system 101 for the shooting apparatus 11 to focus on the shooting target T1. Here, the focus of the shooting apparatus 11 is correlated with the subject distance, and if the state of the optical system 101 such as zoom, iris, and focal length is fixed, the setting value (focus adjustment position) of the optical system 101 is uniquely determined on the basis of the subject distance.

On the other hand, the focus control section 161 of the shooting apparatus 11 focuses on the shooting target T1 by driving the optical system 101 on the basis of the setting value included in the focus control signal.

Alternatively, for example, the focus control signal includes the subject distance of the shooting target T1 with respect to the shooting apparatus 11.

On the other hand, the focus control section 161 of the shooting apparatus 11 calculates a setting value of the optical system 101 for focusing on the shooting target T1 on the basis of the subject distance included in the focus control signal. Then, the focus control section 161 focuses on the shooting target T1 by driving the optical system 101 on the basis of the calculated setting value.

As described above, without using the ranging sensor, it is possible to improve the accuracy of automatic adjustment of the focus of each of the shooting apparatuses 11. Therefore, for example, the shooting apparatus 11-1 and the shooting apparatus 11-2 can accurately focus on the shooting target T1, and the shooting target T1 is clearly shot without blur.

Figure 13:
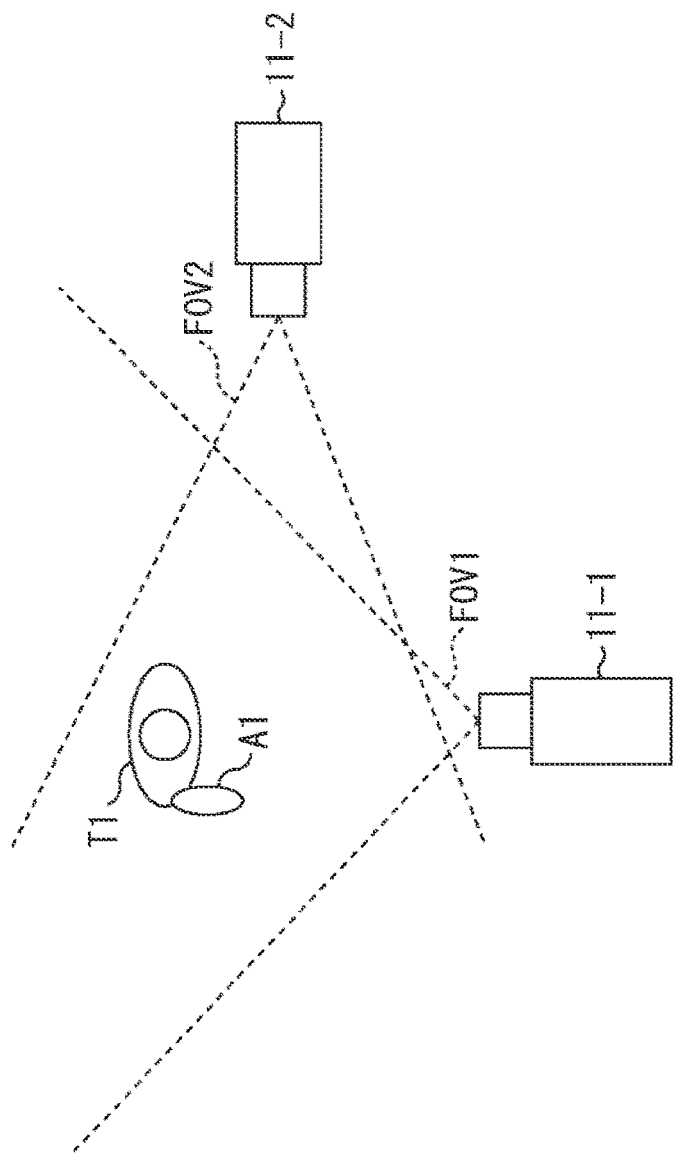
FIG. 13 is a view illustrating an example of a target to be focused.

Furthermore, the shooting apparatus 11-1 and the shooting apparatus 11-2 can focus on the target point Pt1, which is a part of the shooting target T1, by pinpointing. Therefore, for example, as illustrated in FIG. 13, each of the shooting apparatuses 11 can accurately focus on a desired part such as an arm A1 of the shooting target T1.

Moreover, since the shooting target T1 does not exist within the field of view FOV3 of the shooting apparatus 11-3, the shooting apparatus 11-3 alone cannot detect the subject distance of the shooting target T1 with respect to the shooting apparatus 11-3. Therefore, the shooting apparatus 11-3 cannot be adjusted to focus on the shooting target T1 only after the shooting target T1 enters the field of view FOV3.

However, in the present technology, as described above, even if the shooting target T1 does not exist in the field of view FOV3 of the shooting apparatus 11-3, the subject distance of the shooting target T1 with respect to the shooting apparatus 11-3 can be detected. As a result, before the shooting target T1 enters the field of view FOV3, the shooting apparatus 11-3 can virtually focus on the shooting target T1. Therefore, at the moment when the shooting target T1 enters the field of view FOV3, the shooting apparatus 11-3 enters a state of focusing on the shooting target T1.

Figure 14:
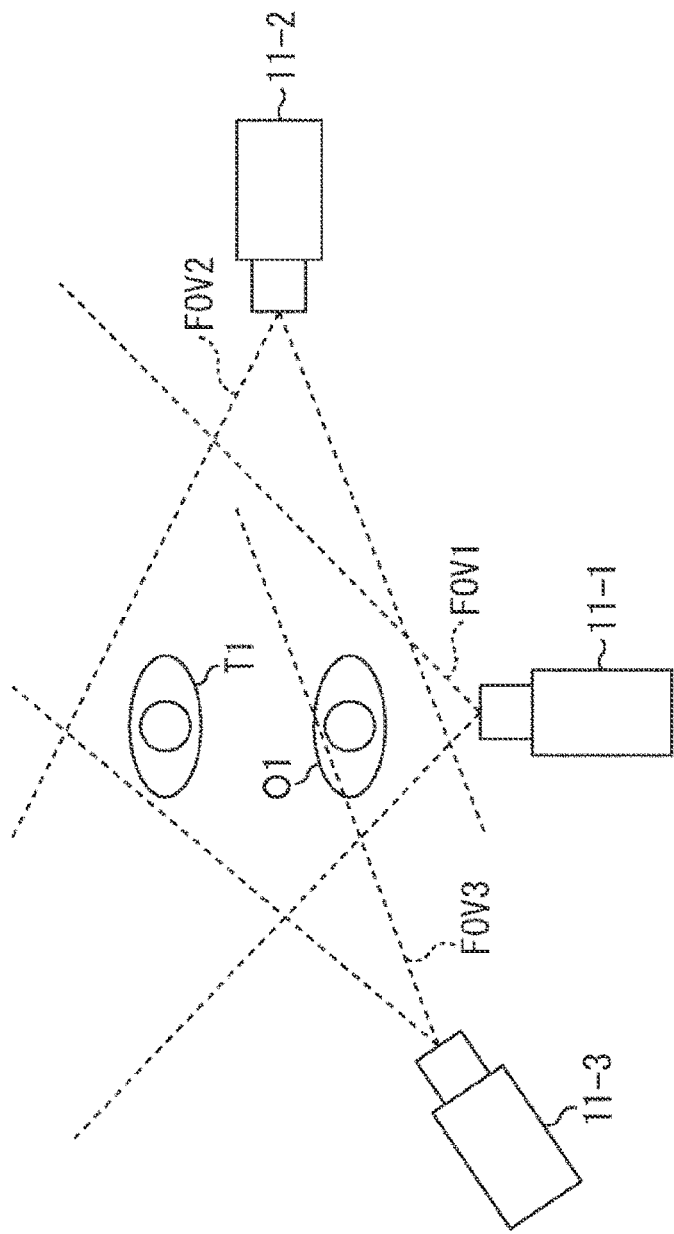
FIG. 14 is a view illustrating an example of a positional relationship between each shooting apparatus and the shooting target.

Furthermore, for example, as illustrated in FIG. 14, even in a case where the shooting target T1 exists within the field of view FOV1 of the shooting apparatus 11-1 but is in a blind spot due to an obstacle O1, which is a human different from the shooting target T1, the subject distance of the shooting target T1 with respect to the shooting apparatus 11-1 can be detected by a similar method. Then, the shooting apparatus 11-1 can virtually focus on the shooting target T1. Therefore, for example, at the moment when the shooting target T1 or the obstacle O1 moves and the shooting target T1 becomes visible from the shooting apparatus 11-1, the shooting apparatus 11-1 enters a state of focusing on the shooting target T1.

Note that, for example, the subject distance of the shooting apparatus 11-3 can be detected by the method described above with reference to FIG. 12 using the shooting apparatus 11-2 instead of the shooting apparatus 11-1. That is, it is also possible to detect the subject distance of the shooting target T1 with respect to the shooting apparatus 11-3 by a similar method on the basis of the positional relationship among the shooting apparatus 11-2, the shooting apparatus 11-3, and the shooting target T1.

Furthermore, for example, the subject distance of the shooting target T1 with respect to the shooting apparatus 11-3 may be detected on the basis of both the positional relationship among the shooting apparatus 11-1, the shooting apparatus 11-3, and the shooting target T1, and the positional relationship among the shooting apparatus 11-2, the shooting apparatus 11-3, and the shooting target T1. In this case, for example, the shooting apparatus 11-3 can focus on the shooting target T1 by using one of the subject distances having been detected, an average value of the subject distances, or the like.

If the number of shooting apparatuses 11 is increased, the number of detections of the subject distance of the shooting target T1 with respect to the shooting apparatus 11-3 can be increased accordingly. Similarly in this case, for example, the shooting apparatus 11-3 can focus on the shooting target T1 by using one of the subject distances having been detected, an average value of the subject distances, a median value of the subject distances, or the like.

Figure 8:
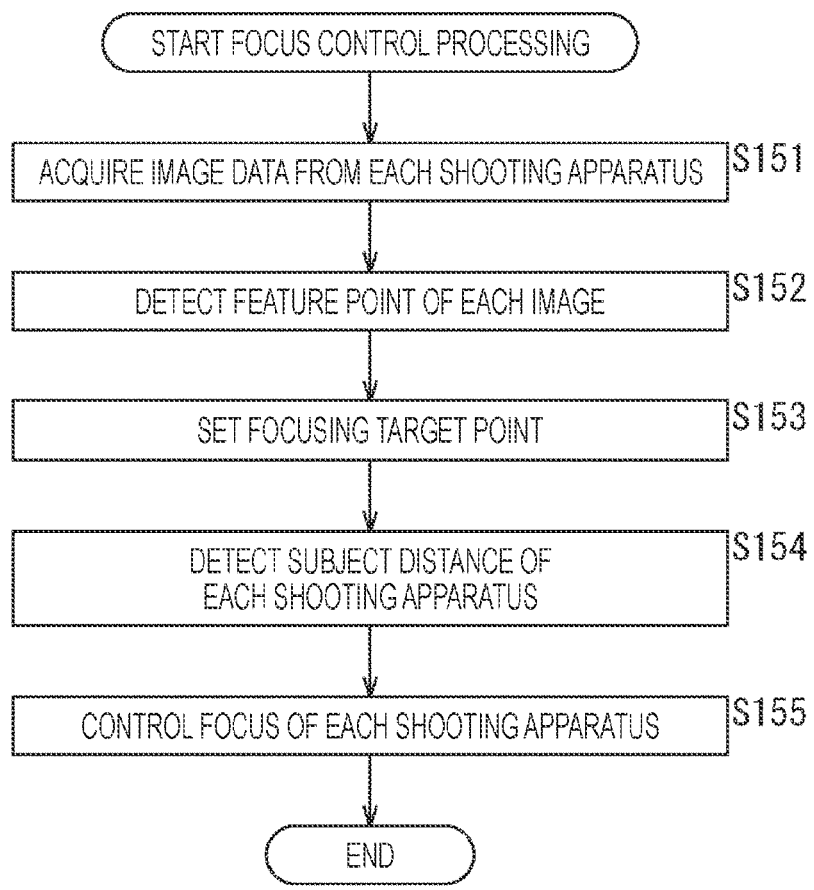
FIG. 8 is a flowchart for explaining focus control processing.

Furthermore, for example, by repeatedly executing the focus control processing of FIG. 8, focus of each of the shooting apparatuses 11 can follow the motion of the shooting target T1.

Moreover, for example, in a case where at least one of the shooting apparatuses 11 moves and the positional relationship between each of the shooting apparatuses 11 changes, by repeatedly executing the position detection processing in FIG. 6 and the focus control processing in FIG. 8, the focus of each of the shooting apparatuses 11 can follow the motion of each of the shooting apparatuses 11 and the shooting target T1.

Second Embodiment of Focus Control Processing

Next, a second embodiment of focus control processing executed by the information processing apparatus 12 will be described with reference to FIG. 15.

This second embodiment is processing in a case of focusing on a subject existing only in the field of view of one shooting apparatus 11.

Figure 15:
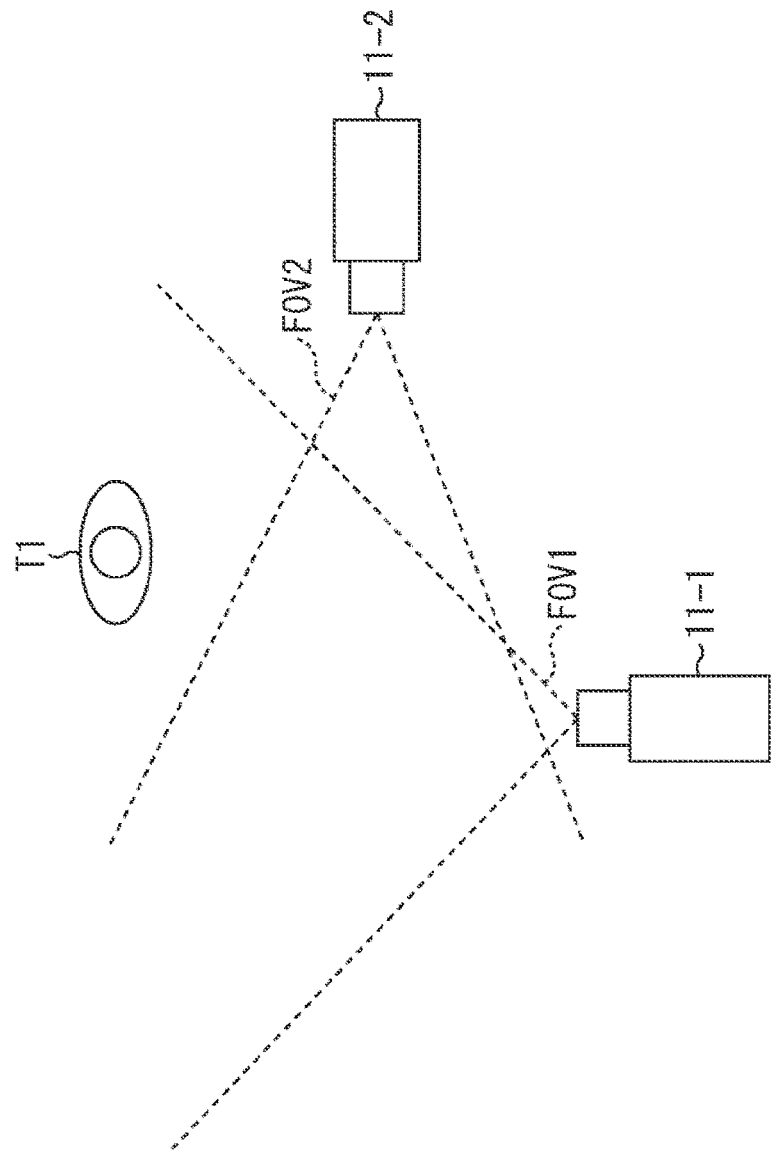
FIG. 15 is a view illustrating an example of a positional relationship between each shooting apparatus and the shooting target.

Hereinafter, a case where the positional relationship between the shooting apparatus 11-1, the shooting apparatus 11-2, and the shooting target T1 is illustrated in FIG. 15 will be described as a specific example. Note that, FIG. 15 does not illustrate the shooting apparatus 11-3.

In this example, the shooting target T1 exists only within the field of view FOV1 of the shooting apparatus 11-1 and exists outside the field of view FOV2 of the shooting apparatus 11-2.

Note that it is assumed that the positional relationship between each of the shooting apparatuses 11 is known by the position detection processing described above with reference to FIG. 6. Therefore, the distance and orientation between each of the shooting apparatuses 11 can be calculated on the basis of the positional relationship between each of the shooting apparatuses 11.

In this case, since the shooting target T1 is shot only by the shooting apparatus 11-1, the subject distance of the shooting target T1 with respect to the shooting apparatus 11-1 cannot be detected by the method described above with reference to FIG. 10.

On the other hand, for example, the shooting apparatus 11-1 can focus on the shooting target T1 by a conventional method such as manual, contrast auto focus (AF), phase difference AF, and image plane phase difference AF.

Here, as described above, the focus of the shooting apparatus 11 has a correlation with the subject distance, and when the state of the optical system 101 is fixed, the focus adjustment position is uniquely determined on the basis of the subject distance. Conversely, when the focus adjustment position is determined, the distance at which the shooting apparatus 11 is in focus is also determined.

Therefore, as described above, by causing the shooting apparatus 11-1 to focus on the shooting target T1, the distance in which the shooting apparatus 11-1 is in focus is determined, and the subject distance of the shooting target T1 with respect to the shooting apparatus 11-1 can be obtained. Then, when the subject distance of the shooting target T1 with respect to the shooting apparatus 11-1 is obtained, the subject distance of the shooting target T1 with respect to the shooting apparatus 11-2 can be calculated by the method described above with reference to FIG. 12. Therefore, the shooting apparatus 11-2 can virtually focus on the shooting target T1.

Note that, in general, the distance in which the shooting apparatus 11-1 is in focus has a certain extent of width (so-called depth of field). Therefore, even if the focus adjustment position of the shooting apparatus 11-1 is determined, the distance from the shooting apparatus 11-1 to the shooting target T1 is not uniquely determined and has a certain extent of width. Therefore, in a case where the subject distance of the shooting target T1 with respect to the shooting apparatus 11-1 is obtained on the basis of the focus adjustment position of the shooting apparatus 11-1, a slight error may occur. As a result, an error also occurs in the subject distance of the shooting target T1 with respect to the shooting apparatus 11-2, and there is a possibility that the shooting apparatus 11-2 does not accurately focus on the shooting target T1.

However, in this case, since the error of the subject distance of the shooting apparatus 11-2 is very small, even if the shooting apparatus 11-2 is not accurately in focus on the shooting target T1, the difference is very small. Therefore, as compared with a case where the focus adjustment of the shooting apparatus 11-2 is started after the shooting target T1 enters the field of view FOV2 of the shooting apparatus 11-2, when the shooting target T1 enters the field of view FOV2 of the shooting apparatus 11-2, the shooting apparatus 11-2 can focus on the shooting target T1 in a shorter time.

<Motion Prediction Processing>

For example, in a case where the position of each of the shooting apparatuses 11 is fixed, by repeatedly executing the focus control processing in FIG. 8, it is possible to detect, in real time, the transition of the positional relationship between each of the shooting apparatuses 11 and the shooting target. Furthermore, in a case where at least one shooting apparatus 11 moves, by repeatedly executing the position detection processing in FIG. 6 and the focus control processing in FIG. 8, as possible to detect, in real time, the transition of the positional relationship between each of the shooting apparatuses 11 and the shooting target.

Then, the motion prediction section 274 of the information processing apparatus 12 can predict the motion of the shooting target with respect to each of the shooting apparatuses 11 on the basis of the transition of the positional relationship between each of the shooting apparatuses 11 and the subject. For example, the motion prediction section 274 can predict the motion of the shooting target with respect to the shooting apparatus 11-1 on the basis of the transition of the distance and direction of the shooting target with respect to the shooting apparatus 11-1.

For example, in a case where the shooting apparatus 11 focuses by the above-described method, a time difference Δt occurs from when the subject distance is detected until the shooting apparatus 11 focuses on the shooting target. Therefore, for example, in a case where the shooting target moves at a high speed, the subject distance changes at the time point when the shooting apparatus 11 focuses on the shooting target, and there is a possibility that the shooting target is not accurately focused.

On the other hand, the time difference Δt is substantially constant, and can be obtained in advance by an actual measurement value or a theoretical value calculation.

Furthermore, by predicting the motion of the shooting target with respect to the shooting apparatus 11, the motion prediction section 274 can predict the subject distance of the shooting target with respect to the shooting apparatus 11 after the time difference Δt. Then, by controlling the focus of the shooting apparatus 11 on the basis of the prediction result of the subject distance of the shooting target with respect to the shooting apparatus 11 after the time difference Δt, the focus control section 275 enables the shooting apparatus 11 to more accurately focus on the shooting target.

<Subject Approach Notification Processing>

For example, the motion prediction section 274 can predict the direction, position, and timing in which the shooting target enters the field of view of the shooting apparatus 11 on the basis of the prediction result of the motion of the shooting target with respect to the shooting apparatus 11. For example, in the example of FIG. 9 described above, it is possible to predict the direction, position, and timing in which the shooting target T1 enters the field of view FOV3 of the shooting apparatus 11-3. For example, in the example of FIG. 15 described above, it is possible to predict the direction, position, and timing in which the shooting target T1 enters the field of view FOV2 of the shooting apparatus 11-2.

Therefore, for example, before the shooting target enters the field of view (angle of view) of the shooting apparatus 11, it is possible to notify the user (for example, the photographer) of the shooting apparatus 11 of the presence or motion of the shooting target existing outside the field of view.

For example, the motion prediction section 274 transmits, to the shooting apparatus 11 via the communication unit 209, motion prediction data indicating the prediction result of the motion of the shooting target existing outside the field of view of the shooting apparatus 11.

The display control section 162 of the shooting apparatus 11 receives the motion prediction data via the communication unit 110, and causes the display unit 105 to display shooting target information for notifying the presence and motion of the shooting target existing outside the field of view on the basis of the motion prediction data.

Figure 16:
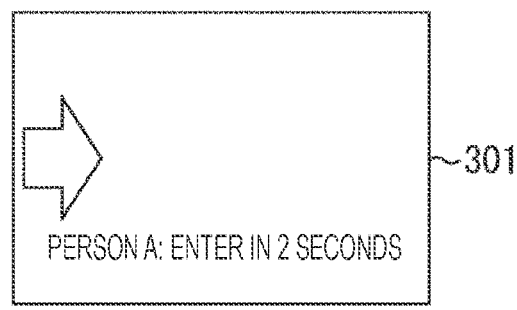
FIG. 16 is a view illustrating an example of a display method of shooting target information.
Figure 17:
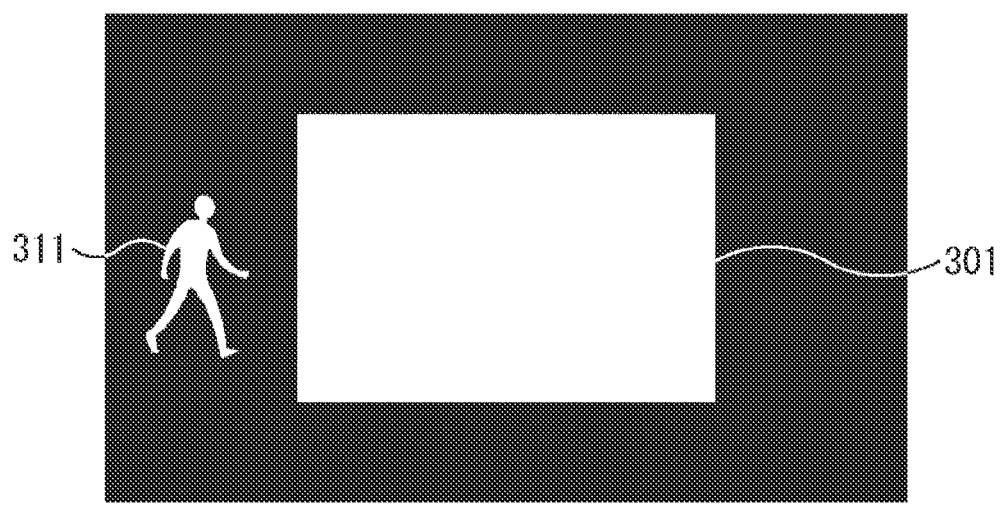
FIG. 17 is a view illustrating an example of the display method of shooting target information.

FIGS. 16 and 17 illustrate examples of a display method of shooting target information.

In the example of FIG. 16, shooting target information is added and displayed in an image 301 shot by the shooting apparatus 11. Specifically, a direction in which the shooting target is predicted to enter the image 301 (the angle of view of the shooting apparatus 11) in the future is indicated by an arrow. Furthermore, the timing (in 2 seconds)) at which a human A, who is the shooting target, is predicted to enter is illustrated.

In the example of FIG. 17, shooting target information is added and displayed outside the image 301 shot by the shooting apparatus 11. Specifically, an animation 311 indicating the human who is the shooting target is displayed outside the image 301. For example, the animation 311 represents the moving direction and speed of the shooting target.

As described above, the user can grasp in advance the direction and timing in which the shooting target enters the image 301 (the angle of view of the shooting apparatus 11). As a result, for example, it becomes possible to more appropriately shoot the shooting target.

Note that, for example, as in the example illustrated in FIG. 14, shooting target information regarding a shooting target existing in a blind spot of the shooting apparatus 11 may be added to an image shot by the shooting apparatus 11 and displayed.

<Timing to Focus on Shooting Target>

For example, as in the examples of FIGS. 9 and 15, in a case where the shooting target exists outside the field of view of the shooting apparatus 11, the timing to focus on the shooting target may be se table.

For example, in the example of FIG. 9, two modes are provided as modes for causing the shooting apparatus 11-3 to focus on the shooting target T1.

The first mode is a mode in which the shooting apparatus 11-3 is caused to focus in S1 seconds after the subject distance of the shooting target T1 with respect to the shooting apparatus 11-3 is detected.

The second mode is a mode in which the shooting apparatus 11-3 is caused to focus S2 seconds before the timing at which the shooting target T1 is predicted to enter the field of view FOV3 of the shooting apparatus 11-3. Note that, as described above, the motion prediction sect on 274 can predict the timing at which the shooting target T1 enters the field of view FOV3.

For example, the user can select the first mode or the second mode and set a setting time S1 or a setting time S2. Then, the focus control section 275 of the information processing apparatus 12 controls the timing at which the shooting apparatus 11-3 focuses on the shooting target T1 by controlling the timing at which the focus control signal is transmitted to the shooting apparatus 11-3 on the basis of the set mode and setting time, for example.

Note that, for example, by selecting the first mode and setting the setting time S1 to 0 seconds, when the subject distance of the shooting target T1 with respect to the shooting apparatus 11-3 is detected, the shooting apparatus 11-3 can immediately focus on the shooting target T1. Therefore, the shooting apparatus 11-3 always focuses on the shooting target T1, and the shooting apparatus 11-3 enters a state of focusing on the shooting target T1 at the moment when the shooting target T1 enters the field of view FOV3.

Furthermore, for example, when the second mode is selected and the setting time S2 is set to 0 seconds, the shooting apparatus 11-3 can immediately focus on the shooting target T1 at the moment when the shooting target T1 enters the field of view FOV3.

Note that it is discretionary the position of the focus before the shooting apparatus 11-3 focuses on the shooting target T1 according to the setting time S1 or the setting time S2. For example, a specific subject may be out of focus, or a subject other than the shooting target may be focused.

2. Modifications

Hereinafter, modifications of the embodiments of the present technology described above will be described.
<Modification Regarding Detection Method of Positional Relationship of Each Shooting Apparatus 11>

The detection method of the positional relationship between each of the shooting apparatuses 11 is not limited to the above-described example, and a discretionary method can be used.

For example, each of the shooting apparatuses 11 may detect the current position and posture, and the information processing apparatus 12 may detect the positional relationship of each of the shooting apparatuses 11 on the basis of the detection result of the current position and posture of each of the shooting apparatuses 11.

Furthermore, for example, in a case where the position of each of the shooting apparatuses 11 is fixed and the positional relationship of each of the shooting apparatuses 11 does not change, the positional relationship of each of the shooting apparatuses 11 may be measured in advance, and the measurement result may be given to the information processing apparatus 12.
<Modification Regarding Focus Control Processing>

While an example in which a common target point is set for each of the shooting apparatuses 11 has been described above, different target points may be set for the respective shooting apparatuses 11. Therefore, the respective shooting apparatuses 11 can focus on different target points.

In this case, it is also possible to set different shooting targets for the respective shooting apparatuses 11. For example, a feature point of a shooting target A can be set as a target point with respect to the shooting apparatus 11-1, and a feature point of a shooting target B can be set as a target point with respect to the shooting apparatus 11-2. Therefore, the respective shooting apparatuses 11 can focus on different shooting targets.

Note that, in a case where each of the shooting apparatuses 11 focuses on a target point according to the first embodiment described above, each target point needs to be set from the feature point detected in images shot by at least two shooting apparatuses 11.

Furthermore, the shooting target is not necessarily a human. For example, it is possible to set an animal such as a dog or a cat, or an object such as a car or a bicycle as a shooting target.
<Modification Regarding Configuration Example of Information Processing System 1>

For example, some or all of the functions of the information processing apparatus 12 can be provided in the shooting apparatus 11.

For example, one of the shooting apparatuses 11 may be set as a master and the rest as slaves, and the master shooting apparatus 11 may be provided with all the functions of the information processing apparatus 12 and the information processing apparatus 12 may be omitted. In this case, for example, image data is transmitted from the slave shooting apparatus 11 to the master shooting apparatus 11, and the master shoot ng apparatus 11 detects the positional relationship between each of the shooting apparatuses 11 and the shooting target. Furthermore, the master shooting apparatus 11 controls the focus of the slave shooting apparatus 11.

Furthermore, for example, each of the shooting apparatuses 11 may detect a feature point in an image, and transmit, to the information processing apparatus 12, data indicating a detection result of the feature point.

Moreover, for example, the information processing apparatus 12 may be applied to a server in cloud computing or the like, and the server may provide a service of controlling the focus of each of the shooting apparatuses 11.

3. Others

<Configuration Example of Computer>

The above-described series of processing can be executed by hardware or can be executed by software. In a case where the series of processing is executed by software, a program constituting the software is installed in a computer. Here, the computer includes a computer incorporated in dedicated hardware, and a general-purpose personal computer, for example, capable of executing various functions by installing various programs.

Note that the program executed by the computer may be a program in which processing is performed in time series along the order explained in the present description, or may be a program in which processing is performed in parallel or at a necessary timing such as when a call is made.

Furthermore, in the present description, the system means a set of a plurality of configuration elements (apparatuses, modules (components), and the like), and it does not matter whether or not all the configuration elements are in the same housing. Therefore, a plurality of apparatuses housed in separate housings and connected via a network and one apparatus in which a plurality of modules is housed in one housing are both systems.

Moreover, the embodiments of the present technology are not limited to the above-described embodiments, and various modifications can be made without departing from the gist of the present technology.

For example, the present technology can have a configuration of cloud computing in which one function is shared by a plurality of apparatuses via a network and is processed in cooperation.

Furthermore, each step explained in the above-described flowcharts can be executed by one apparatus or executed by a plurality of apparatuses in a shared manner.

Moreover, in a case where one step includes a plurality of processing, the plurality of processing included in the one step can be executed by one apparatus or executed by a plurality of apparatuses in a shared manner.
<Configuration Combination Example>

The present technology can also have the following configurations.

(1)

An information processing apparatus including:

a position detection section that detects a distance between a first shooting apparatus and a shooting target on the basis of a positional relationship among the first shooting apparatus, a second shooting apparatus, and the shooting target, which is a target to be focused; and a focus control section that controls focus of the first shooting apparatus on the basis of a distance between the first shooting apparatus and the shooting target.

(2)

The information processing apparatus according to the (1), in which
the position detection section detects a distance between the first shooting apparatus and the shooting target on the basis of a positional relationship of the first shooting apparatus with the second shooting apparatus and a positional relationship of the second shooting apparatus with the shooting target.

(3)

The information processing apparatus according to the (2), in which
the position detection section detects a distance between the first shooting apparatus and the shooting target on the basis of a distance between the first shooting apparatus and the second shooting apparatus, a distance between the second shooting apparatus and the shooting target, and an angle between a direction of the first shooting apparatus with respect to the second shooting apparatus and a direction of the shooting target.

(4)

The information processing apparatus according to the (3), in which
the position detection section detects a distance between the second shooting apparatus and the shooting target on the basis of a distance between the second shooting apparatus and a third shooting apparatus, an angle between a direction of the third shooting apparatus with respect to the second shooting apparatus and a direction of the shooting target, and an angle between a direction of the second shooting apparatus with respect to the third shooting apparatus and a direction of the shooting target.

(5)

The information processing apparatus according to the (4), in which
the position detection section detects an angle between a direction of the third shooting apparatus with respect to the second shooting apparatus and a direction of the shooting target on the basis of an image of the shooting target shot by the second shooting apparatus, and detects an angle between a direction of the second shooting apparatus with respect to the third shooting apparatus and a direction of the shooting target on the basis of an image of the shooting target shot by the third shooting apparatus.

(6)

The information processing apparatus according to any of the (2) to (5), in which
the position detection section detects a distance between the shooting target present outside a field of view or in a blind spot of the first shooting apparatus and the first shooting apparatus on the basis of a positional relationship of the first shooting apparatus with the second shooting apparatus and a positional relationship of the second shooting apparatus with the shooting target.

(7)

The information processing apparatus according to the (6), in which
the focus control section controls timing at which the first shooting apparatus focuses on the shooting target.

(8)

The information processing apparatus according to the (7), in which
the focus control section controls focus of the first shooting apparatus for the first shooting apparatus to focus on the shooting target a predetermined time after a distance between the first shooting apparatus and the shooting target is detected or a predetermined time before timing at which the shooting target is predicted to enter an angle of view of the first shooting apparatus.

(9)

The information processing apparatus according to any of the (6) to (8) further including:
a display control section that performs control to display shooting target information regarding the shooting target present outside a field of view or in a blind spot of the first shooting apparatus by adding the shooting target information to an image shot by the first shooting apparatus.

(10)

The information processing apparatus according to the (9), in which
the shooting target information includes a prediction result of motion of the shooting target with respect to the first shooting apparatus.

(11)

The information processing apparatus according to the (2), in which
the position detection section detects a positional relationship of the second shooting apparatus with the shooting target on the basis of a positional relationship of the second shooting apparatus with a third shooting apparatus, an image of the shooting target shot by the second shooting apparatus, and an image of the shooting target shot by the third shooting apparatus.

(12)

The information processing apparatus according to the (11), in which
the position detection section detects a positional relationship among the first shooting apparatus, the second shooting apparatus, and the third shooting apparatus on the basis of an image shot by the first shooting apparatus, an image shot by the second shooting apparatus, and an image shot by the third shooting apparatus.

(13)

The information processing apparatus according to any of the (1) to (12), in which
the position detection section detects a positional relationship of the first shooting apparatus with the shooting target on the basis of a positional relationship of the first shooting apparatus with the second shooting apparatus and a positional relationship of the second shooting apparatus with the shooting target,
the information processing apparatus further including:
a motion prediction section that predicts motion of the shooting target with respect to the first shooting apparatus on the basis of transition of a positional relationship of the first shooting apparatus with the shooting target.

(14)

The information processing apparatus according to the (13), in which
the motion prediction section predicts a distance between the first shooting apparatus and the shooting target after a predetermined time, and
the focus control section controls focus of the first shooting apparatus on the basis of a predicted distance between the first shooting apparatus and the shooting target.

(15)

The information processing apparatus according to any of the (1) to (14), in which the position detection section detects a distance between the first shooting apparatus and the shooting target on the basis of a distance between the first shooting apparatus and the second shooting apparatus, an angle between a direction of the second shooting apparatus with respect to the first shooting apparatus and a direction of the shooting target, and an angle between a direction of the first shooting apparatus with respect to the second shooting apparatus and a direction of the shooting target.

(16)

The information processing apparatus according to any of the (1) to (15), in which the position detection section detects a positional relationship of the first shooting apparatus with the second shooting apparatus on the basis of an image shot by the first shooting apparatus and an image shot by the second shooting apparatus.

(17)

The information processing apparatus according to any of the (1) to (16), in which the position detection section detects a distance between the first shooting apparatus and a target part to be focused of the shooting target on the basis of a positional relationship among the first shooting apparatus, the second shooting apparatus, and the target part of the shooting target, and the focus control section controls focus of the first shooting apparatus to focus on the target part of the shooting target on the basis of a distance between the first shooting apparatus and the target part of the shooting target.

(18)

The information processing apparatus according to any of the (1) to (17), in which the information processing apparatus is included in the first shooting apparatus.

(19)

An information processing method including:

detecting a distance between a first shooting apparatus and a shooting target on the basis of a positional relationship among the first shooting apparatus, a second shooting apparatus, and the shooting target; and controlling focus of the first shooting apparatus on the basis of a distance between the first shooting apparatus and the shooting target.

(20)

A program for causing a computer to execute processing of detecting a distance between a first shooting apparatus and a shooting target on the basis of a positional relationship among the first shooting apparatus, a second shooting apparatus, and the shooting target, and controlling focus of the first shooting apparatus on the basis of a distance between the first shooting apparatus and the shooting target.

Note that the effects described in the present description are merely examples and are not limited, and other effects may be present.

REFERENCE SIGNS LIST

1 Information processing system
11-1 to 11-3 Shooting apparatus
12 Information processing apparatus
101 Optical system
104 CPU
105 Display unit
151 Information processing section
161 Focus control section
162 Display control section
201 CPU
251 Information processing section
261 Shooting apparatus control section
262 Output control section
271 Feature point detection section
272 Target point setting section
273 Position detection section
274 Motion prediction section
275 Focus control section

The invention claimed is:

1. An information processing apparatus comprising:

a position detection section configured to detect a distance between a first shooting apparatus and a shooting target on a basis of a positional relationship among the first shooting apparatus, a second shooting apparatus, and the shooting target, which is a target to be focused; and a focus control section configured to control focus of the first shooting apparatus on a basis of the distance between the first shooting apparatus and the shooting target, wherein the position detection section detects the distance between the first shooting apparatus and the shooting target on the basis of the positional relationship according to a respective angle of each respective shooting apparatus detected on a basis of an image of the shooting target shot by the respective shooting apparatus, and wherein the position detection section and the focus control section are each implemented via at least one processor.

2. The information processing apparatus according to claim 1, wherein the position detection section detects the distance between the first shooting apparatus and the shooting target on a basis of a positional relationship of the first shooting apparatus with the second shooting apparatus and a positional relationship of the second shooting apparatus with the shooting target.

3. The information processing apparatus according to claim 2, wherein the position detection section detects the distance between the first shooting apparatus and the shooting target on a basis of a distance between the first shooting apparatus and the second shooting apparatus, a distance between the second shooting apparatus and the shooting target, and an angle between a direction of the first shooting apparatus with respect to the second shooting apparatus and a direction of the shooting target.

4. The information processing apparatus according to claim 3, wherein the position detection section detects the distance between the second shooting apparatus and the shooting target on a basis of a distance between the second shooting apparatus and a third shooting apparatus, an angle between a direction of the third shooting apparatus with respect to the second shooting apparatus and the direction of the shooting target, and an angle between a direction of the second shooting apparatus with respect to the third shooting apparatus and the direction of the shooting target.

5. The information processing apparatus according to claim 4, wherein
the position detection section
detects the angle between the direction of the third shooting apparatus with respect to the second shooting apparatus and the direction of the shooting target on a basis of an image of the shooting target shot by the second shooting apparatus, and
detects the angle between the direction of the second shooting apparatus with respect to the third shooting apparatus and the direction of the shooting target on a basis of an image of the shooting target shot by the third shooting apparatus.

6. The information processing apparatus according to claim 2, wherein
the position detection section detects a distance between the shooting target present outside a field of view or in a blind spot of the first shooting apparatus and the first shooting apparatus on a basis of a positional relationship of the first shooting apparatus with the second shooting apparatus and a positional relationship of the second shooting apparatus with the shooting target.

7. The information processing apparatus according to claim 6, wherein
the focus control section controls timing at which the first shooting apparatus focuses on the shooting target.

8. The information processing apparatus according to claim 7, wherein
the focus control section controls focus of the first shooting apparatus for the first shooting apparatus to focus on the shooting target a predetermined time after the distance between the first shooting apparatus and the shooting target is detected or a predetermined time before timing at which the shooting target is predicted to enter an angle of view of the first shooting apparatus.

9. The information processing apparatus according to claim 6 further comprising:
a display control section configured to perform control to display shooting target information regarding the shooting target present outside a field of view or in a blind spot of the first shooting apparatus by adding the shooting target information to an image shot by the first shooting apparatus,
wherein the display control section is implemented via at least one processor.

10. The information processing apparatus according to claim 9, wherein
the shooting target information includes a prediction result of motion of the shooting target with respect to the first shooting apparatus.

11. The information processing apparatus according to claim 2, wherein
the position detection section detects a positional relationship of the second shooting apparatus with the shooting target on a basis of a positional relationship of the second shooting apparatus with a third shooting apparatus, an image of the shooting target shot by the second shooting apparatus, and an image of the shooting target shot by the third shooting apparatus.

12. The information processing apparatus according to claim 11, wherein
the position detection section detects a positional relationship among the first shooting apparatus, the second shooting apparatus, and the third shooting apparatus on a basis of an image shot by the first shooting apparatus, an image shot by the second shooting apparatus, and an image shot by the third shooting apparatus.

13. The information processing apparatus according to claim 1,
wherein the position detection section detects a positional relationship of the first shooting apparatus with the shooting target on a basis of a positional relationship of the first shooting apparatus with the second shooting apparatus and a positional relationship of the second shooting apparatus with the shooting target,
wherein the information processing apparatus further comprises:
a motion prediction section configured to predict motion of the shooting target with respect to the first shooting apparatus on a basis of transition of a positional relationship of the first shooting apparatus with the shooting target, and
wherein the motion prediction section is implemented via at least one processor.

14. The information processing apparatus according to claim 13, wherein
the motion prediction section predicts the motion based on a predicted distance between the first shooting apparatus and the shooting target after a predetermined time, and
the focus control section controls focus of the first shooting apparatus on a basis of the predicted distance between the first shooting apparatus and the shooting target after the predetermined time.

15. The information processing apparatus according to claim 1, wherein
the position detection section detects the distance between the first shooting apparatus and the shooting target on a basis of a distance between the first shooting apparatus and the second shooting apparatus, an angle between a direction of the second shooting apparatus with respect to the first shooting apparatus and a direction of the shooting target, and an angle between a direction of the first shooting apparatus with respect to the second shooting apparatus and the direction of the shooting target.

16. The information processing apparatus according to claim 1, wherein
the position detection section detects a positional relationship of the first shooting apparatus with the second shooting apparatus on a basis of an image shot by the first shooting apparatus and an image shot by the second shooting apparatus.

17. The information processing apparatus according to claim 1, wherein
the position detection section detects a distance between the first shooting apparatus and a target part to be focused of the shooting target on a basis of a positional relationship among the first shooting apparatus, the second shooting apparatus, and the target part of the shooting target, and
the focus control section controls focus of the first shooting apparatus to focus on the target part of the shooting target on a basis of a distance between the first shooting apparatus and the target part of the shooting target.

18. The information processing apparatus according to claim 1, wherein
the information processing apparatus is included in the first shooting apparatus.

19. An information processing method comprising:
- detecting a distance between a first shooting apparatus and a shooting target on a basis of a positional relationship among the first shooting apparatus, a second shooting apparatus, and the shooting target; and
- controlling focus of the first shooting apparatus on a basis of the distance between the first shooting apparatus and the shooting target,
- wherein the distance between the first shooting apparatus and the shooting target is detected on the basis of the positional relationship according to a respective angle of each respective shooting apparatus detected on a basis of an image of the shooting target shot by the respective shooting apparatus.

20. A non-transitory computer-readable storage medium having embodied thereon a program, which when executed by a computer causes the computer to execute an information processing method, the method comprising:
- detecting a distance between a first shooting apparatus and a shooting target on a basis of a positional relationship among the first shooting apparatus, a second shooting apparatus, and the shooting target, and
- controlling focus of the first shooting apparatus on a basis of the distance between the first shooting apparatus and the shooting target,
- wherein the distance between the first shooting apparatus and the shooting target is detected on the basis of the positional relationship according to a respective angle of each respective shooting apparatus detected on a basis of an image of the shooting target shot by the respective shooting apparatus.

* * * * *